United States Patent [19]
Yamada et al.

[11] Patent Number: 5,424,879
[45] Date of Patent: Jun. 13, 1995

[54] APPARATUS FOR MAGNETIC RECORDING AND REPRODUCING DIGITAL AUDIO DATA ALLOCATES UPPER BITS AND LOWER BITS ON AN ALTERNATING BASIS AMONG PAIR OF TRACKS

[75] Inventors: Makoto Yamada, Tokyo; Masayoshi Noguchi, Chiba, both of Japan

[73] Assignee: Sony Corporation, Tokyo, Japan

[21] Appl. No.: 140,320

[22] Filed: Oct. 22, 1993

[30] Foreign Application Priority Data

Oct. 30, 1992 [JP] Japan .................................. 4-315783
Dec. 22, 1992 [JP] Japan .................................. 4-357075

[51] Int. Cl.⁶ .................................................. G11B 5/02
[52] U.S. Cl. .................................... 360/22; 360/29; 360/10.3
[58] Field of Search ..................... 360/29, 22, 32, 47, 360/48, 53, 8, 18, 10.1, 10.3; 371/37.4, 37.7, 40.1

[56] References Cited

U.S. PATENT DOCUMENTS

| 4,685,004 | 8/1987 | Takahashi et al. | 360/32 |
| 4,819,090 | 4/1989 | Hikawa | 360/32 |
| 4,972,417 | 11/1990 | Sako et al. | 360/38.1 X |
| 5,311,372 | 5/1994 | Matsumi et al. | 360/22 X |

Primary Examiner—Andrew L. Sniezek
Attorney, Agent, or Firm—Jay H. Maioli

[57] ABSTRACT

A recording and/or reproducing apparatus divides long bit-length data into upper bit data and lower bit data, and records both data along with discriminating data in a manner that the upper-bit data and the lower-bit data are allocated and recorded, on an alternating basis, onto the scan start side areas and the scan end side areas of a plurality of pairs of recording tracks, in order to obtain more high-quality digital audio signal to be recorded and reproduced.

17 Claims, 24 Drawing Sheets

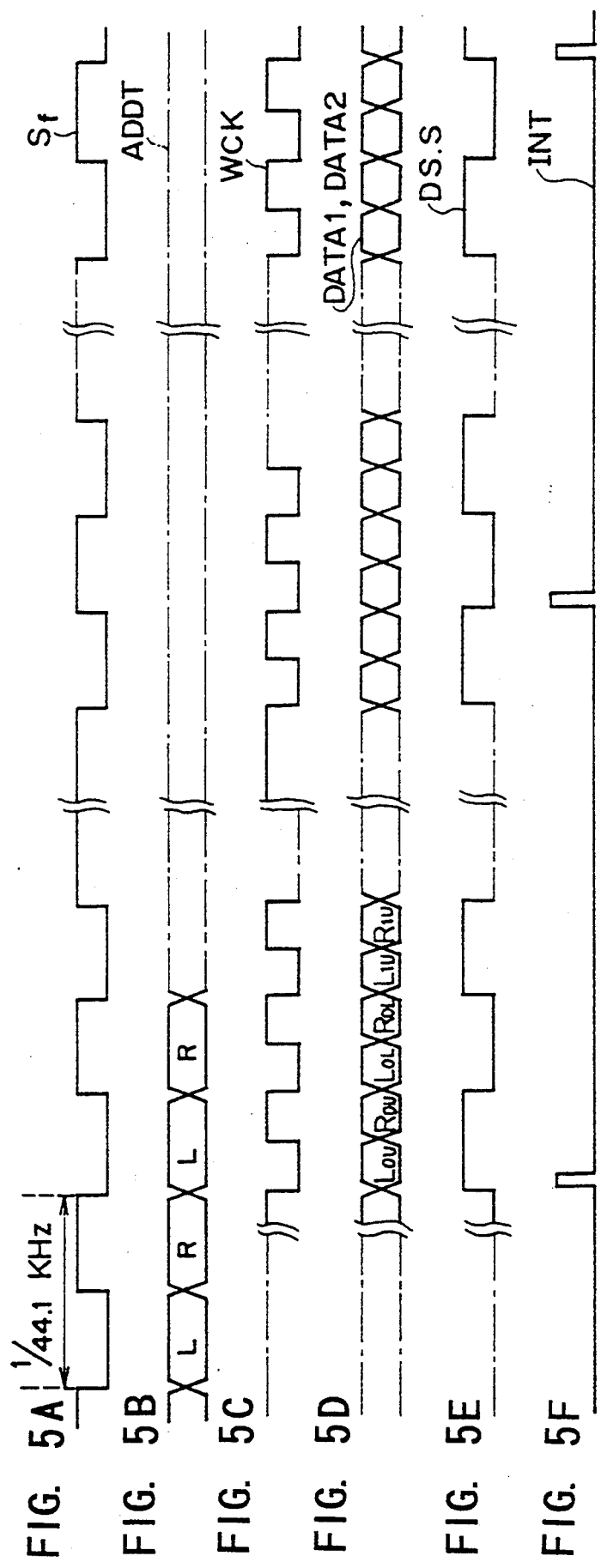

| | Lch 16 BITS | | Rch 16 BITS D1 |

| | Lch 20 BITS | | Rch 20 BITS ADDT |

| | Lch 16 BITS | | Rch 16 BITS | | | | | DATA1 |

Lch L 4BITS
Rch L 4BITS

U···UPPER
L···LOWER

SUB DATA

MAIN DATA

FIG. 13B  FRAME ADDRESS  15  0  1  2

FIG. 13C  FRAME ADDRESS  1  0  1  0

U···UPPER
L···LOWER

INT

EXSY

DATA2

FRAME NUMBER

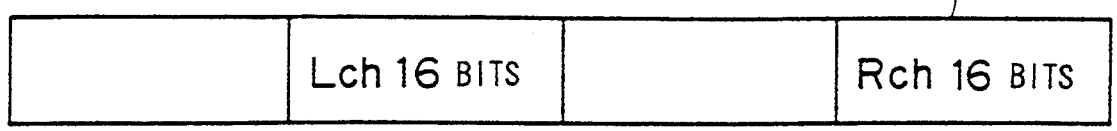
FIG. 15A
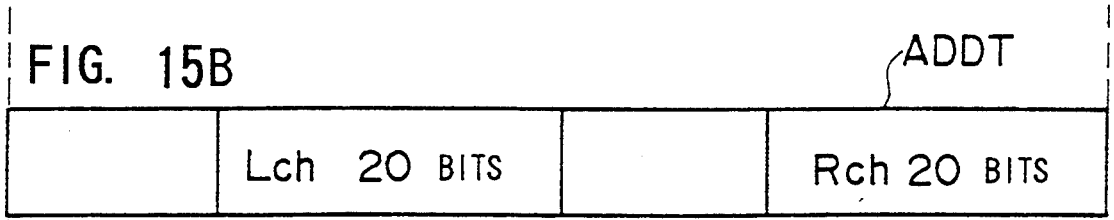
FIG. 15B
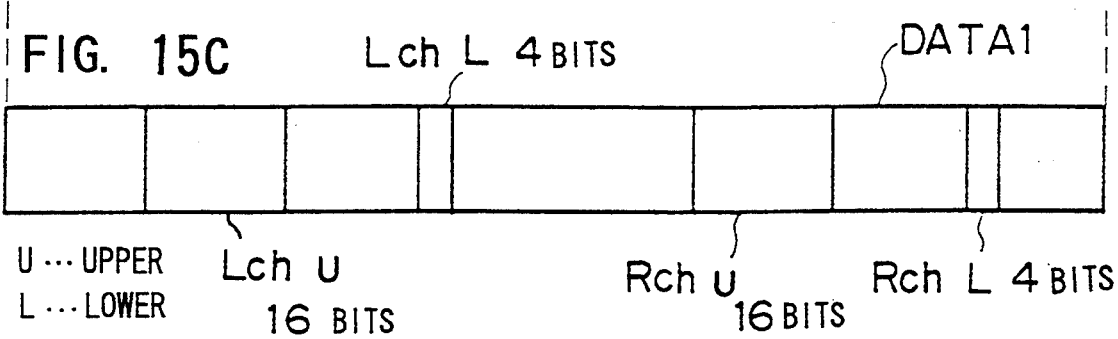
FIG. 15C
FIG. 18A
FIG. 18B
FIG. 18C
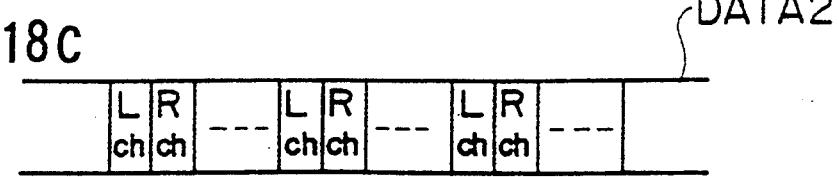
FIG. 18D
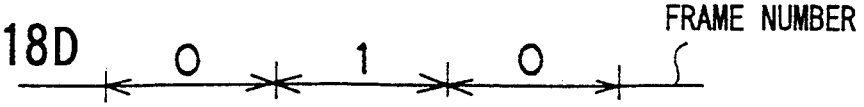

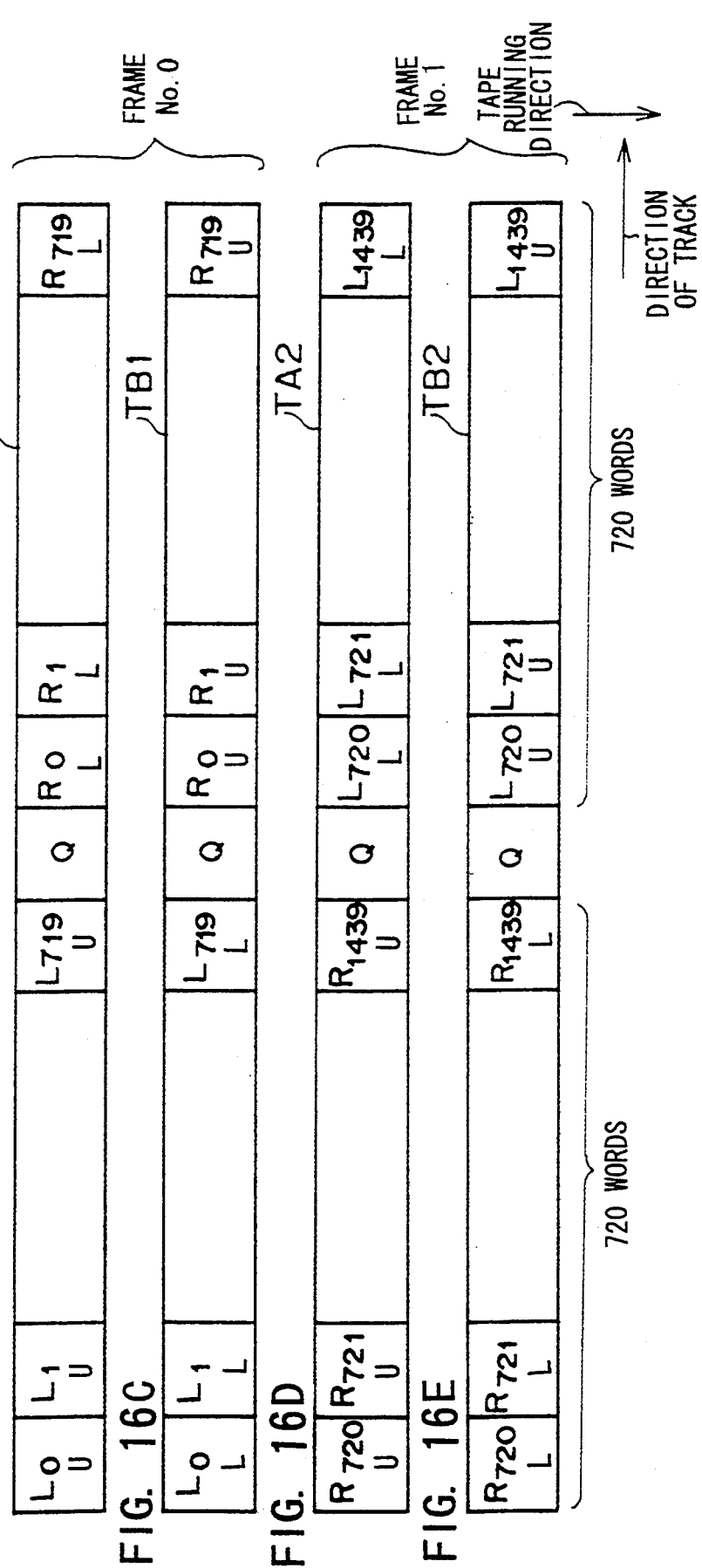

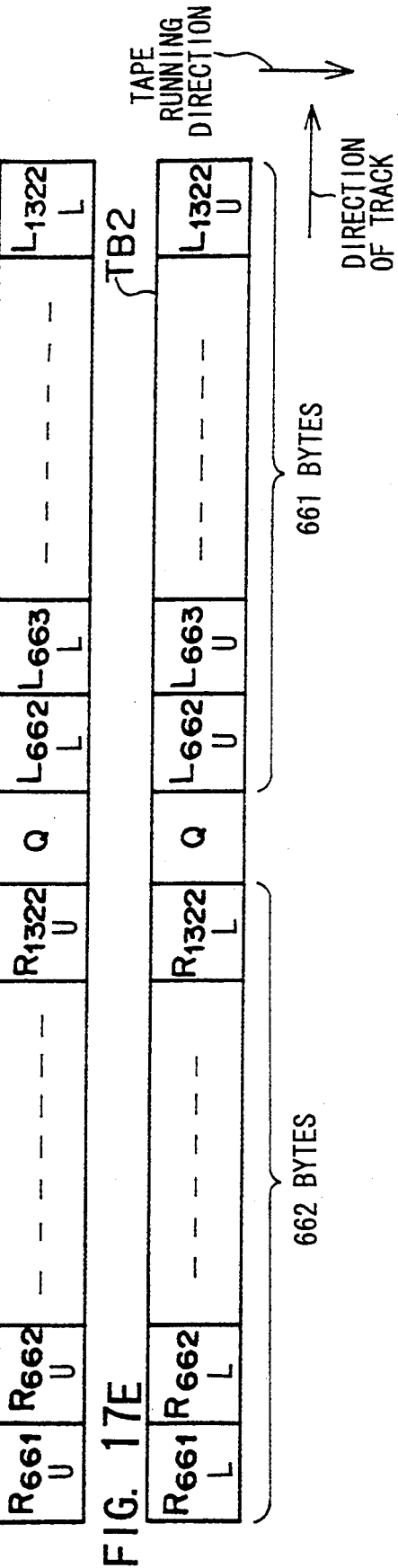

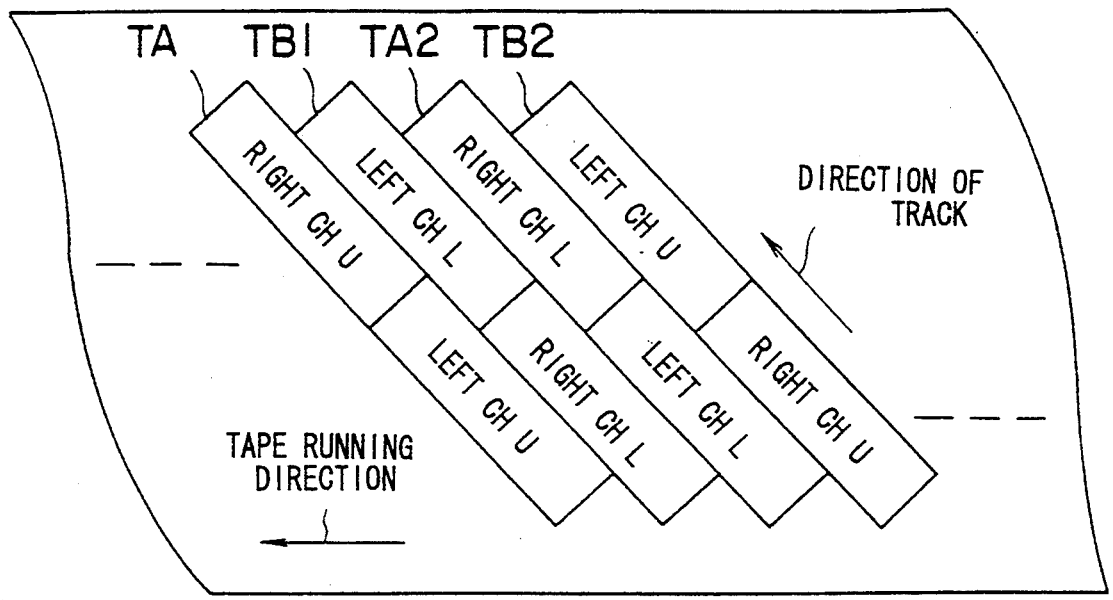
FIG. 19
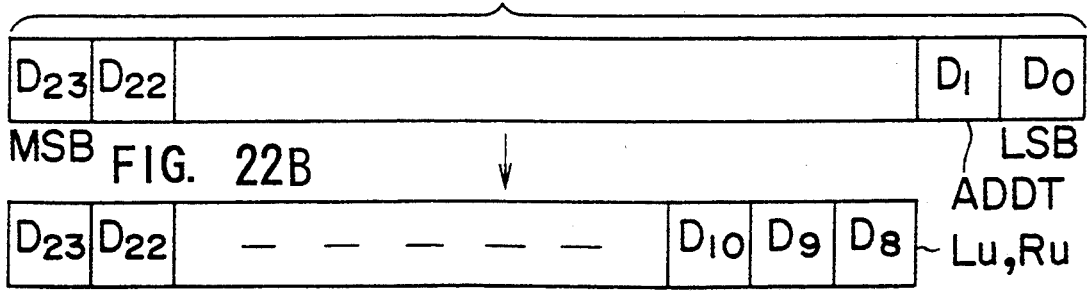
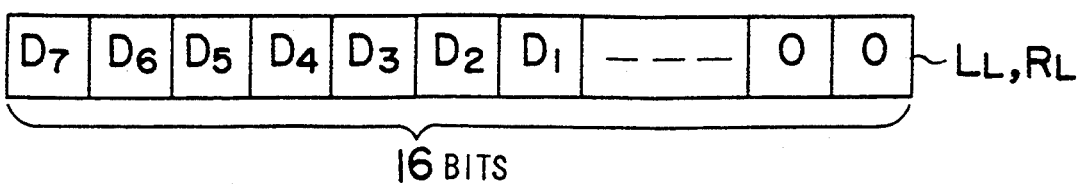

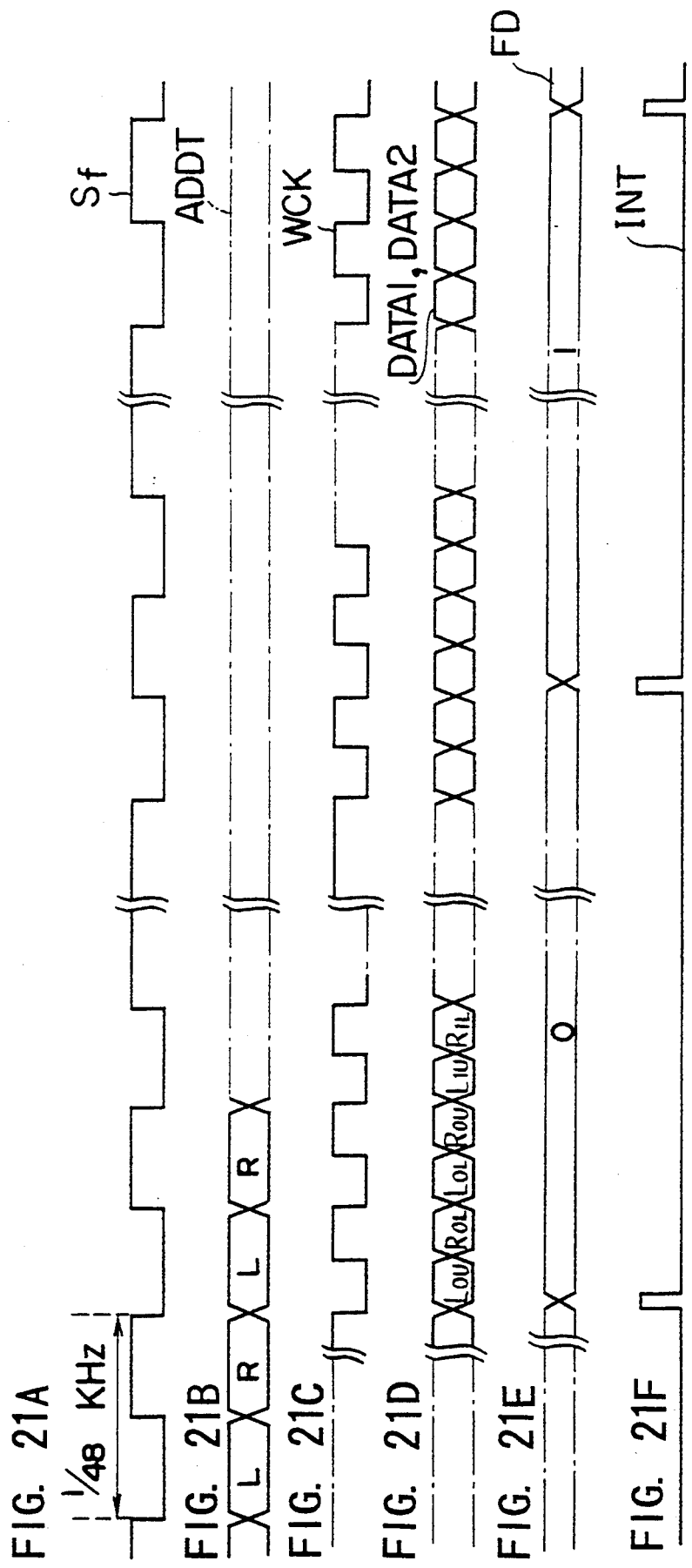

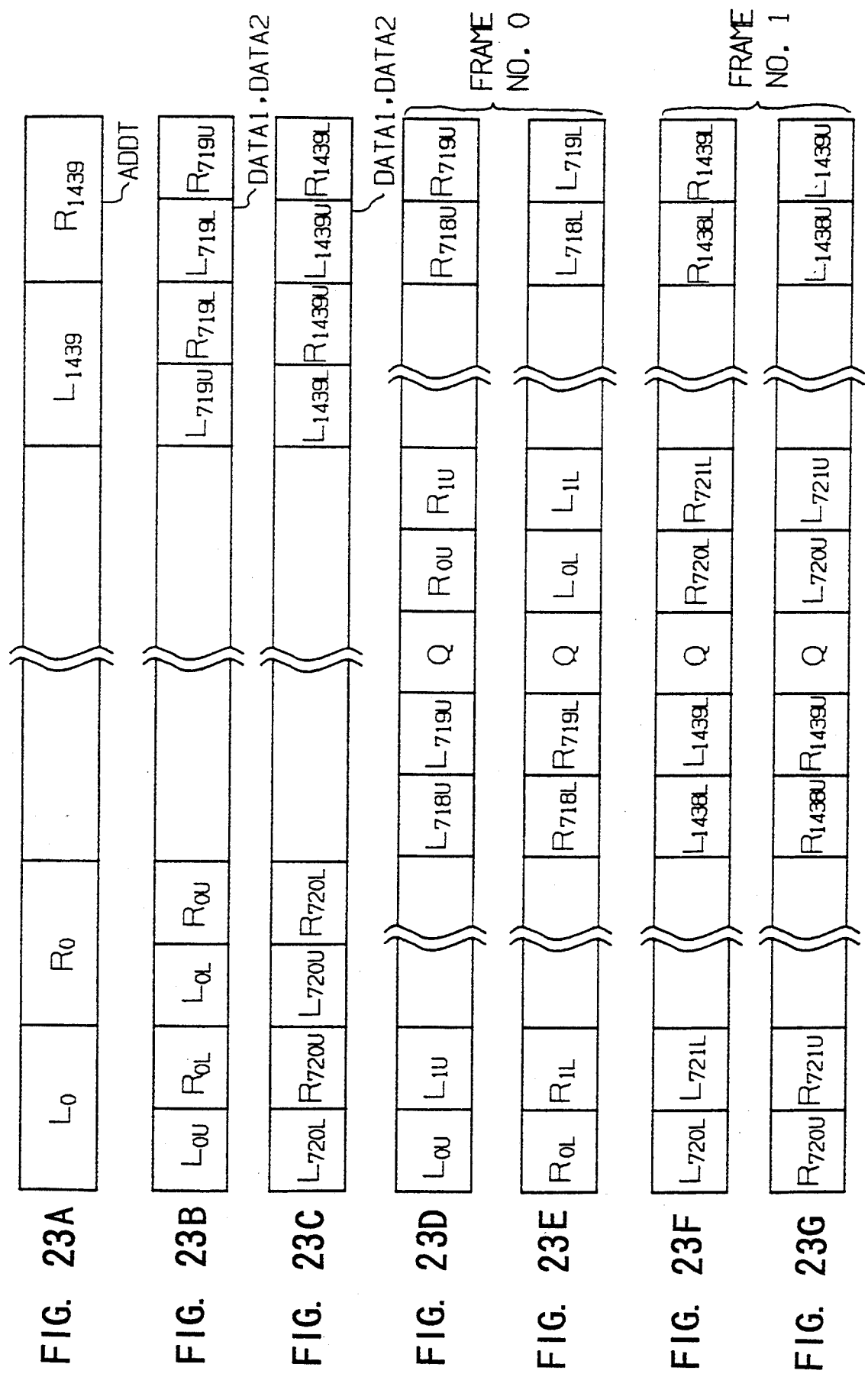

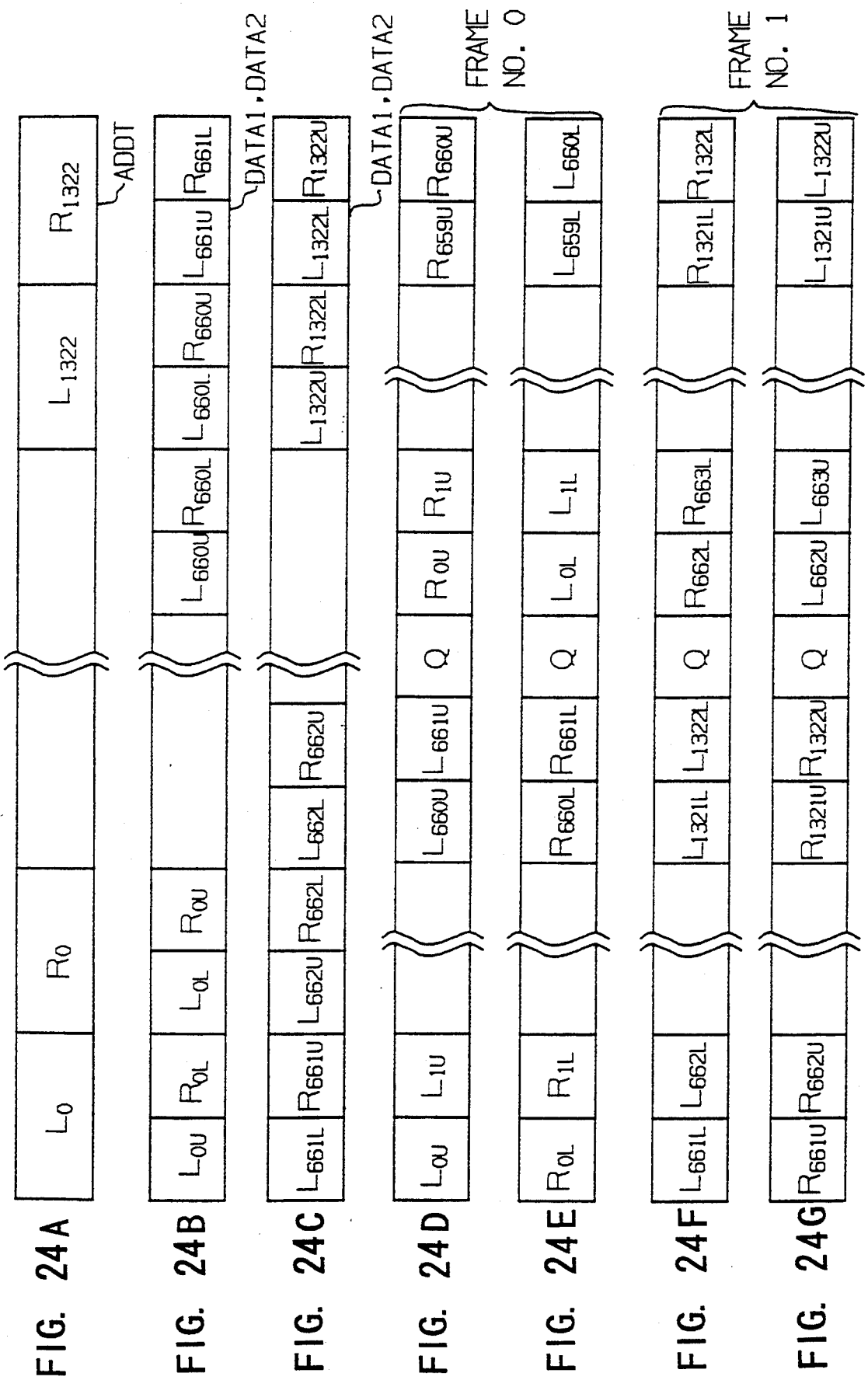

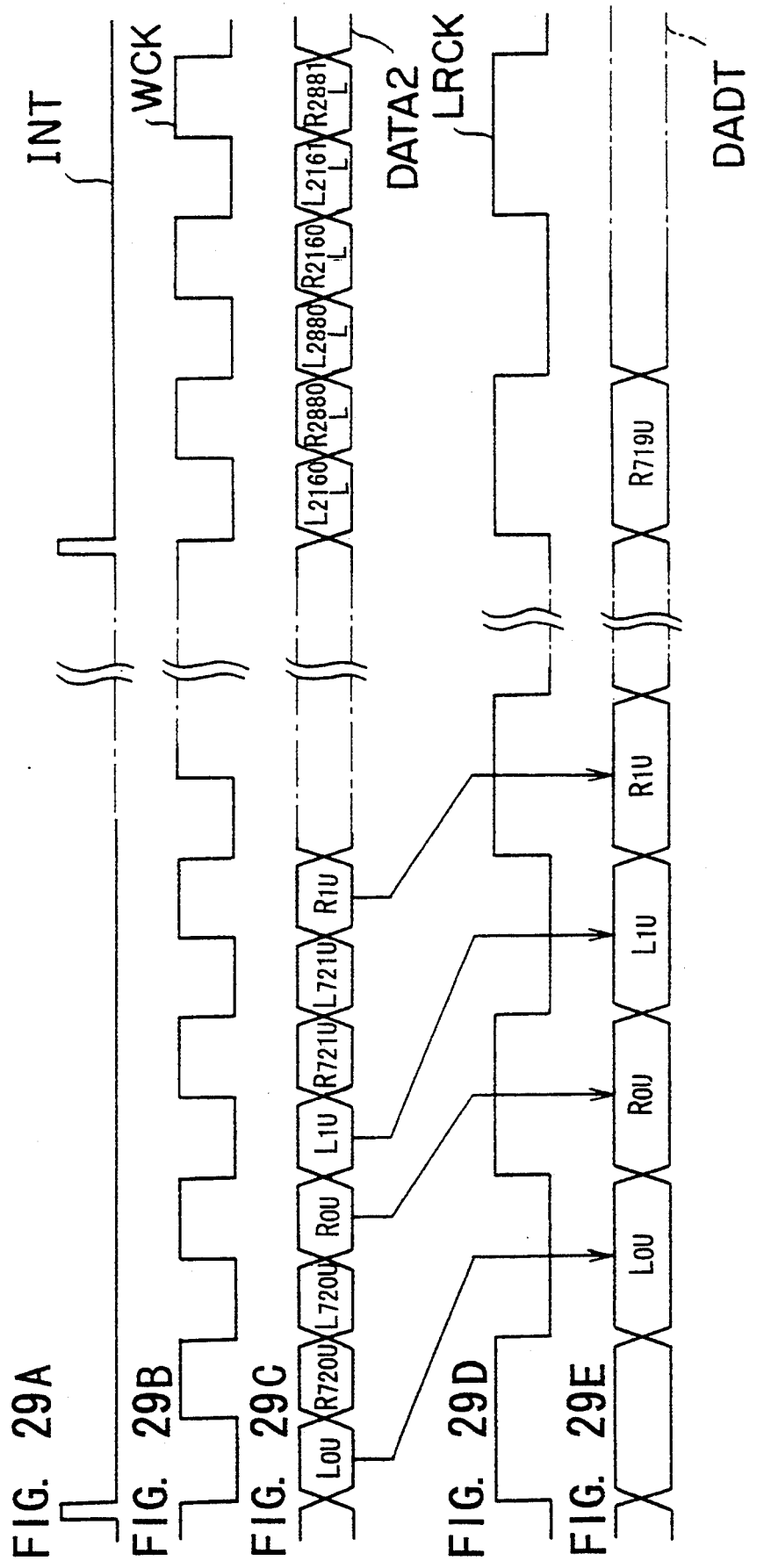

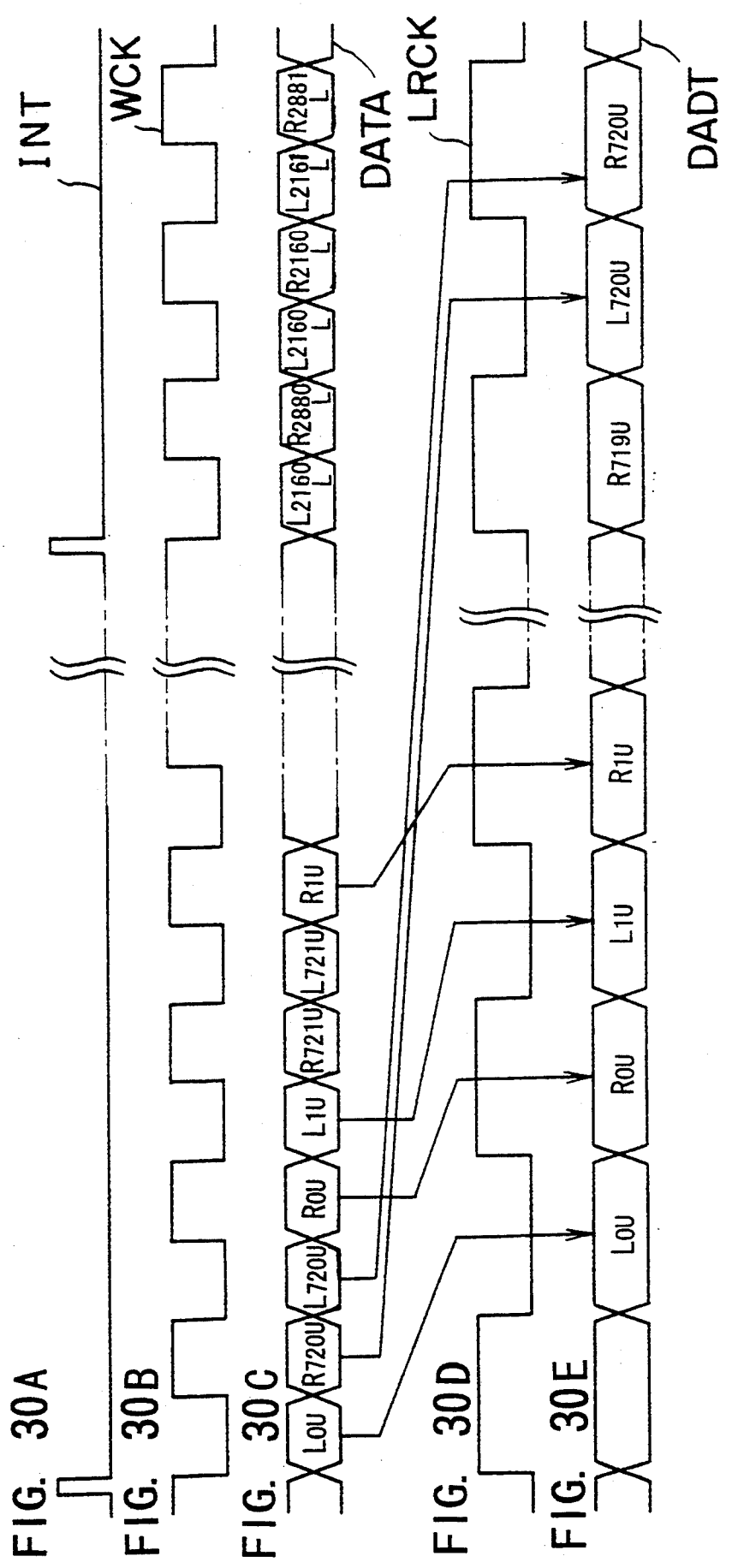

APPARATUS FOR MAGNETIC RECORDING AND REPRODUCING DIGITAL AUDIO DATA ALLOCATES UPPER BITS AND LOWER BITS ON AN ALTERNATING BASIS AMONG PAIR OF TRACKS

BACKGROUND OF THE INVENTION

1. Field of the Invention

This invention relates to a magnetic recording and/or reproducing apparatus, and more particularly to an improvement of the recording and reproducing of a high quality audio signal using a digital audio tape recorder.

2. Description of the Related Art

In the conventional digital audio tape recorder, helical recording tracks are formed along a magnetic tape so that a high-quality digital audio signal is recorded and reproduced.

In the digital audio tape recorder 1 shown in FIG. 1, when a tape cassette 2 is loaded, a magnetic tape 6 is taken up from the tape cassette 2 by moving guide posts 4 and is then wrapped around a rotary drum 8.

Further in the digital tape recorder 1, when a user manipulates switches to set up a recording mode or a reproducing mode, the rotary drum 8 is rotatably driven at a predetermined speed, and a capstan motor is driven to run the magnetic tape 6 at a predetermined running speed.

When the user selects the recording mode in the digital audio tape recorder 1a, two-channel 16-bit digital audio signal D1 is input to a digital signal processing circuit 10, which executes dividing the digital audio signals into blocks in synchronization with the rotating period of the rotary drum 8.

After the audio data of which the audio signal arranged in blocks is interleaved in units of blocks, the digital signal processing circuit 10 generates an error correcting code, and outputs the error correcting code with the interleaved audio data as well as sub data and the like to an 8–10 modulating circuit 12.

The 8–10 modulating circuit 12 performs 8–10 modulation of the output data sequentially provided from the digital signal processing circuit 10 to convert it into recording data which are then fed to a magnetic head mounted on the rotary drum 8 via a recording amplifying circuit 14.

In the digital audio tape recorder 1, a positive azimuth angle recording track and a negative azimuth angle recording track in pairs are sequentially formed, and audio data are recorded onto the pair of recording tracks in block-by-block units. Thereby, the digital audio tape recorder records sequentially the digital audio signal D1 according to the standardized format.

In the digital audio tape recorder 1, for example, as shown in FIGS. 2A and 2B, left channel audio data D1L and right channel audio data D1R denoted, respectively by symbols L0, L1, L2, L3, ... and symbols R0, R1, R2, R3, ... (FIGS. 2A and 2B), are arranged in blocks at a period of 30 [msec] and then interleaved.

In the digital audio tape recorder 1, recording tracks TA and TB are divided into a scan start side area and a scan end side area, and the audio data are recorded onto each area.

FIG. 3 shows it schematically. Namely, in a first recording track TA having a positive azimuth angle, left channel's even series of audio data L0, L2, ..., L1438 are recorded onto the scan start side area, and right channel's odd series of audio data R1, R3, ..., R1439 are recorded onto the scan end side area in succession to the scan start side area.

In a second recording track TB having a negative azimuth angle, right channel's even series of audio data R0, R2, ..., R1438 are recorded onto the scan start side area, and left channel's odd series of audio data L1, L3, ..., L1439 are recorded onto the scan end side area in succession to the scan start side area.

As has a representative of this method of interleave, for example, U.S. Pat. No. 4,685,004 is known.

When the user selects the reproducing mode in the digital audio tape recorder 1, a reproducing signal SPB provided from a magnetic head is amplified by a reproducing amplifying circuit 16, and thus output to the next 10-8 demodulating circuit 18.

The 10-8 demodulating circuit 18 converts the amplified reproducing signal into a two-value signal, and then 10-8 demodulates the two-value signal, contrary to the manner of the 8–10 modulating circuit 12, and operates to reproduce audio data, an error correcting code, sub-data, and the like.

A digital signal processing circuit 20 error corrects the output signal of the 10-8 demodulating circuit 18 by using the error correcting code, and interpolates the resulting audio data as required.

The digital signal processing circuit 20 de-interleaves the audio data sequentially output, to reproduce digital audio signal D2.

Audio instruments used in a studio or the like are designed to record and reproduce a long bit-length digital audio signal, compared with a digital audio tape recorder for consumers.

If a long bit-length digital audio signal can be recorded and reproduced by the digital audio tape recorder, a digital audio tape recorder with higher sound quality can be realized.

SUMMARY OF THE INVENTION

In view of the foregoing, an object of this invention is to provide a magnetic recording and/or reproducing apparatus with higher sound quality (higher quantizing bit), without changing substantially the above described conventional magnetic recording and/or reproducing apparatus.

The foregoing object and other objects of this invention have been achieved by the provision of a magnetic recording and/or reproducing apparatus 30 in which, given data DADT1 are sequentially recorded onto recording tracks TA1, TB1, TA2, and TB2 which are formed sequentially and helically along a magnetic tape, comprising: a data converting circuit for dividing the sequentially input audio data ADDT of a left channel and a right channel into upper bit data and lower bit data, so as to generate converted data DATA1 in which the audio data inclusive of the lower-bit data and upper-bit data are continuously arranged in a predetermined sequence; recording signal generating circuits for interleaving the converted data DATA1 at a predetermined interleave period, and then for converting the interleaved data along with an error correcting code into recording data; and recording data recording systems for generating at the interleave period a pair of recording tracks TA1 and TB1 having respectively a positive azimuth angle and a negative azimuth angle, and for sequentially recording the recording data onto the recording tracks TA1 and TB1, wherein: the data converting circuit generates converted data DADT1 in which the upper-bit audio data and the lower-bit audio data are continuously arranged in the predetermined sequence, by allowing the upper-bit audio data and the lower-bit audio data to be output in the predetermined sequence in the processing period equal to a plurality of the interleave process periods, and, in connection with a plurality of pairs of TA1, TB1, TA2, and TB2 formed in synchronization with the processing period, the data converting circuit divides each of the recording tracks TA1, TB1, TA2, and TB2 into predetermined recording areas, and records right-channel upper-bit audio data, right-channel lower-bit audio data, left-channel upper-bit audio data, and left-channel lower-bit audio data, onto each recording area of the plurality pairs of recording tracks TA1, TB1, TA2, and TB2 in a different layout in each area of the recording tracks TA1, TB1, TA2, and TB2.

Further, in the magnetic recording and/or reproducing apparatus, data converting circuit sets processing period to twice the interleave period, and then divides each of tracks TA1, TB1, TA2, and TB2 into a scan start side recording area and a scan end side recording area wherein two pairs of recording tracks TA1, TB1, TA2, and TB2 are formed in synchronization with the processing period:

in two pairs of recording tracks TA1, TB1, TA2, and TB2;

left-channel or right-channel upper-bit audio data over the first half of the processing period is recorded to the scan start side recording area of the first recoding track TA1, and right-channel or left-channel lower-bit audio data over the first half of the processing period is recorded to the succeeding scan end side recording area;

right-channel or left-channel upper-bit audio data over the first half of the processing period is recorded to the scan start side area of the second recording track TB1, and left-channel or right-channel lower-bit audio data over the first half of the processing period is recorded to the succeeding scan end side recording area;

left-channel or right-channel lower-bit audio data over the second half of the processing period is recorded to the scan start side recording area of the third recording track TA2, and right-channel or left-channel upper-bit audio data over the second half of the processing period is recorded to the succeeding scan end side recording area; and right-channel or left-channel lower-bit audio data over the second half of the processing period is recorded to the fourth recording track TB2, and left-channel or right-channel upper-bit audio data over the second half of the processing period is recorded to the succeeding scan end side recording area, by producing the converted data DATA1 in which the upper-bit audio data and the lower-bit audio data are continuous.

Further, as the second embodiment of this invention, in the converting circuit:

left-channel or right-channel upper-bit audio data over the first half of the processing period is recorded to the scan start side recording area of the first recording track TA1, and right-channel or left-channel lower-bit audio data over the first half of the processing period is recorded to the succeeding scan end side recording area;

left-channel or right-channel lower-bit audio data over the first half of the processing period is recorded to the scan start side recording area of the second recording track TB1, and right-channel or left-channel upper-bit audio data over the first half of the processing period is recorded to the succeeding scan end side recording area;

right-channel or left-channel upper-bit audio data over the second half of the processing period is recorded to the scan start side recording area of the third recording track TA2, and left-channel or right-channel lower-bit audio data over the second half of the processing period is recorded to the succeeding scan end side recording area; and right-channel or left-channel lower-bit audio data over the second half of the processing period is recorded to the fourth recording track TB2, left-channel or right-channel upper-bit audio data over the second half of the processing period is recorded to the succeeding scan end side recording area, by producing converting data DATA1 in which the upper-bit audio data and the lower-bit audio data are continuous.

Further as the third embodiment of this invention, in the data converting circuit:

left-channel or right-channel upper-bit audio data over the first half of the processing period is recorded to the scan start side recoding area of the first recording track TA1, and right-channel or left-channel upper-bit audio data over the first half of the processing period is recorded to the succeeding scan end side recording area;

right-channel or left-channel lower-bit audio data over the first half of the processing period is recorded to the scan start side recording area of the second recording track TB1, and left-channel or right-channel lower-bit audio data over the first half of the processing period is recorded to the succeeding scan end side recording area;

left-channel or right-channel lower-bit audio data over the second half of the processing period is recorded to the scan start side recording area of the third recording track TA2, and right-channel or left-channel lower-bit audio data over the second half of the processing period is recorded to the succeeding scan end side recording area; and right-channel or left-channel upper-bit audio data over the second half of the processing period is recorded to the fourth recording track TB2, and left-channel or right-channel upper-bit audio data over the second half of the processing period is recorded to the succeeding scan end side recording area, by producing the converted data DATA1 in which the upper-bit audio data and the lower-bit audio data are continuous.

Further, this invention comprises data generating means for discriminating data S which discriminates between the upper-bit audio data and the lower-bit audio data, to record the discriminating data S along with the upper-bit audio data and the lower-bit audio data onto the magnetic tape.

Further in this invention, the discriminating data S are allocated to redundant bits of the converting data DATA1 and recorded.

Further in this invention, the discriminating data generating means produces sub-code data including the sampling frequency and time information of the audio data DATA1, and allocates the discriminating data to the sub-code data, and outputs them. Recording signal generating circuits convert the subcode data along with the interleaved the upper-bit audio data, lower-bit audio data, and the error correcting code into the recording data to record the discriminating data onto the recording tracks TA1, TB1, TA2, and TB2.

Further, a magnetic recording and/or reproducing apparatus according to this invention, comprises a reproducing apparatuses which, in a reproducing mode, reproduce the magnetic tape in order to obtain reproducing data by demodulating reproducing signal SPB output from the magnetic head, after error correcting obtained reproducing data, de-interleave to output the reproducing audio data DATA2, and a reproducing data converting circuit which converts the reproducing audio data DATA2 into right and left-channel audio data ADDT. The reproducing converting circuit links the reproducing audio data DATA2, based on the discriminating data S which is reproduced along with the reproducing data DATA2, so as to convert the reproducing audio data DATA2 into the audio data DADT, so that the audio data ADDT which are recorded with upper-bits separated from lower bits, are reproduced.

Further in this invention, the reproducing data converting circuit links the reproducing audio data DATA2 based on the sampling frequency $f_S$ of the reproducing audio data DATA2 in addition to the discriminating data S, as to convert into the audio data DADT. When the number of sampled values of the right- and left-channel audio data ADDT over the interleave period is an even number, the reproducing data converting circuit converts the reproducing audio data DADT2 into the audio data ADDT so that lower-bit audio data are linked to the corresponding upper-bit audio data, by switching the linking sequence between the first and second recording tracks TA1 and TB1 and the second and third recording tracks TA2 and TB2.

Further in this invention, the reproducing data converting circuit, during cue reviewing, selects the upper-bit audio data out of the reproducing audio data DATA2 relative to the discriminating data S, and outputs the selected audio data DADT.

Further, a magnetic recording and/or reproducing apparatus according to this invention comprises reproducing circuits which, in a reproducing mode, obtain up reproducing data by demodulating reproducing signal SPB output from the magnetic head while the magnetic tape is reproduced and which output reproducing audio data DATA2 by deinterleaving the reproducing data after error correcting processing, and a reproducing data converting circuit converts the reproducing audio data DATA2 into right- and left-channel audio data ADDT. The reproducing converting circuit, in a variable speed reproducing mode, selectively receives the upper-bit audio data output by the reproducing circuits and expands to the received audio data along the time axis, and outputs the time expanded data in the sequence as they are recorded.

Further in this invention, the reproducing data converting circuits comprise a delay circuit which delays by a predetermined interleave period the reproducing audio data DATA2 output by the reproducing circuits and which output the delayed audio data, and selective processing means which selectively process the output data from the delay circuit and the reproducing audio data DATA2 output from the reproducing circuits and. The reproducing data converting circuits in a variable speed reproducing mode, output in the processing period in the sequence taken for recording, the upper-bit audio data which the selective processing means provide in a sequence different from that taken for recording, by switching in the interleave period according to a reproducing speed between the inputs to be processed by the selective processing means.

In connection with a plurality of pairs of recording tracks TA1, TB1, TA2, and TB2 formed in synchronization with the processing period, each of the recording tracks TA1, TB1, TA2, and TB2 is divided into predetermined recording areas, and the right-channel upper-bit audio data, the right-channel lower-bit audio data, the left-channel upper-bit audio data, and the left-channel lower-bit audio data are allocated onto each recording area of the plurality pairs of recording tracks TA1, TB1, TA2, and TB2 in a different layout in each area of the recording tracks TA1, TB1, TA2, and TB2, and thus long bit-length audio data can be recorded while audio data with bit errors in a burst are correctly reproduced.

By recording the discriminating data S along with the upper-bit and lower-bit audio data onto the magnetic tape, the original audio data ADDT are reproduced based on the discriminating data S.

Further, by allocating the discriminating data S to a redundant bit of the converted DATA1 or to subcode data, the original audio data ADDT are readily reproduced.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 5A to 5F are signal waveform diagrams explaining the data processing;

Figures 8A, 8B, 8C, 8D, 8E:
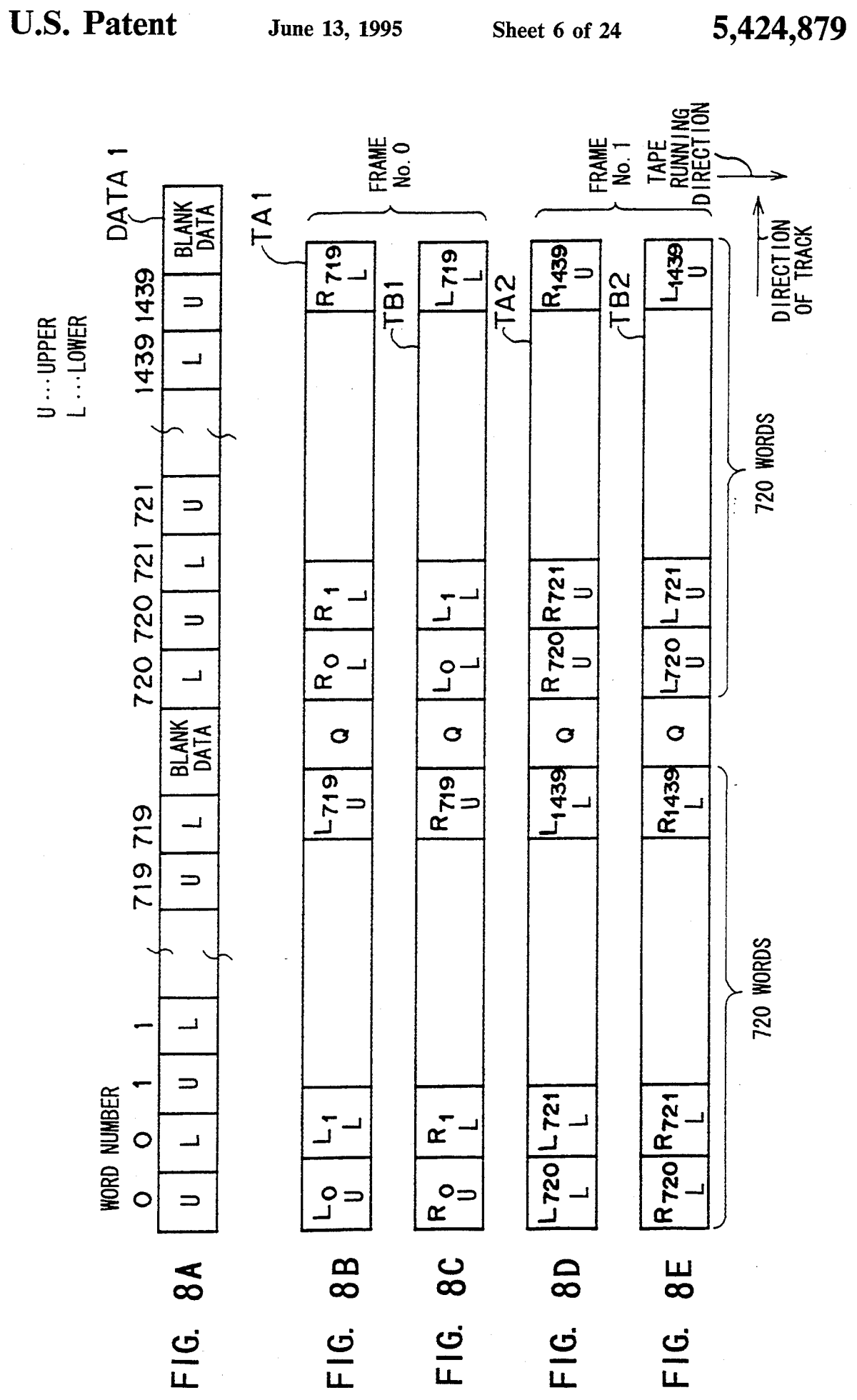

FIGS. 8A to 8E are schematic diagrams showing recorded data at a sampling frequency of 48 [kHz];

Figures 9A, 9B, 9C, 9D, 9E:
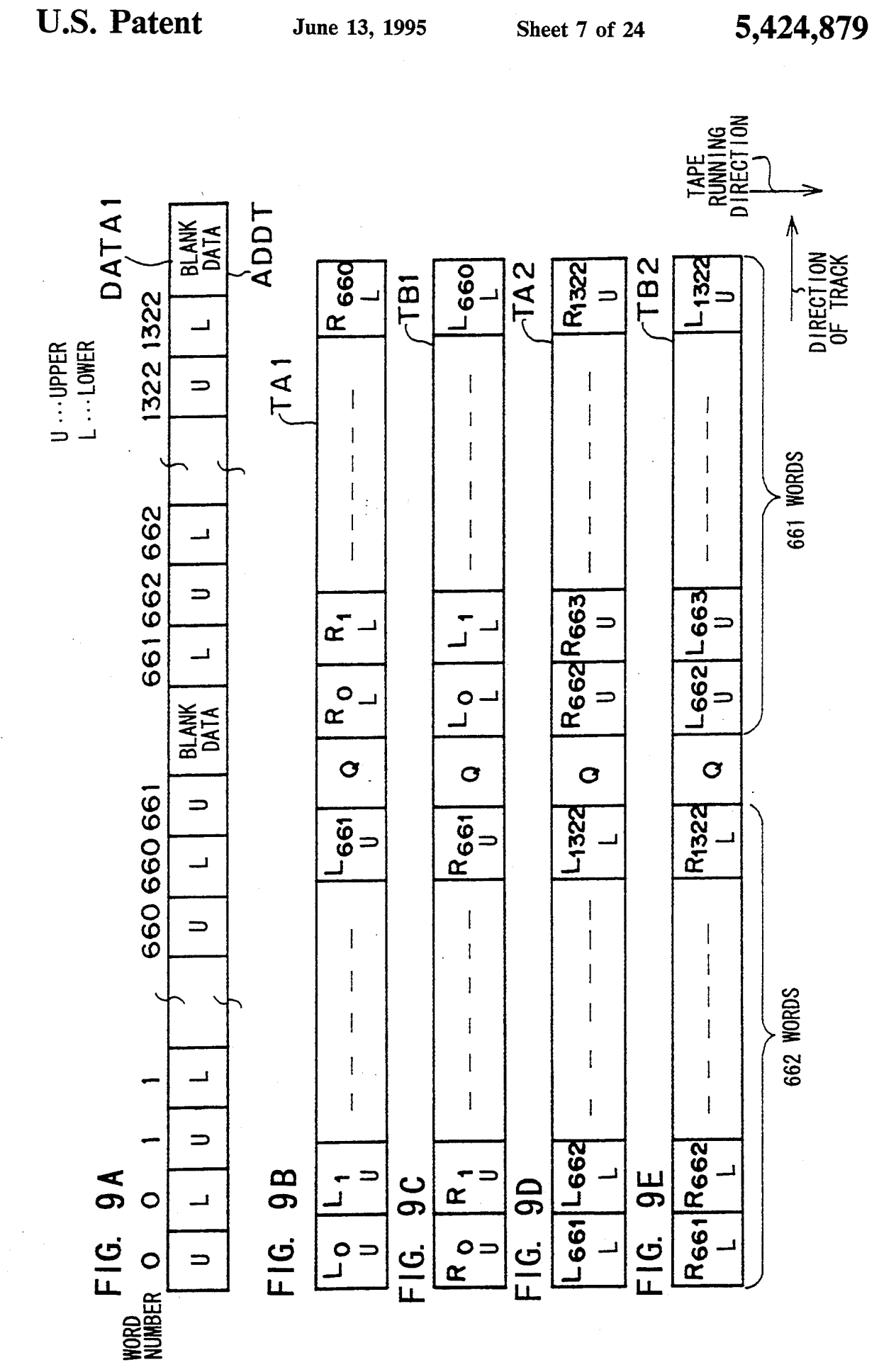

FIGS. 9A to 9E are schematic diagrams showing recorded data at a sampling frequency of 44.1 [kHz];

FIGS. 13A to 13C are schematic diagrams explaining discrimination between the upper bits and the lower bits;

FIGS. 15A to 15C are schematic diagrams explaining the division of audio data according to the third embodiment;

FIGS. 16A to 16E are schematic diagrams showing actually recorded data at a sampling frequency of 48 [kHz];

FIGS. 17A to 17E are schematic diagrams showing actually recorded data at a sampling frequency of 44.1 [kHz];

FIGS. 18A to 18D are schematic diagrams explaining the reproducing processing;

FIG. 19 is a schematic diagram showing the layout of data on a magnetic tape according to the fourth embodiment;

FIG. 21A to 21F are signal waveform diagrams explaining the data processing;

FIGS. 22A to 22C are schematic diagrams explaining the division of audio data;

FIGS. 23A to 23G are schematic diagrams illustrating actually recorded data at a sampling frequency 48 [kHz];

FIGS. 24A to 24G are schematic diagrams illustrating actually recorded data at a sampling frequency 44.1 [kHz];

FIGS. 29A to 29E are waveform diagrams explaining processing of the reproducing signal; and FIGS. 30A to 30E are signal waveform diagrams explaining processing of the reproducing signal.

DETAILED DESCRIPTION OF THE EMBODIMENT

Preferred embodiments of this invention will be described with reference to the accompanying drawings:

(1) First Embodiment

Figure 1:
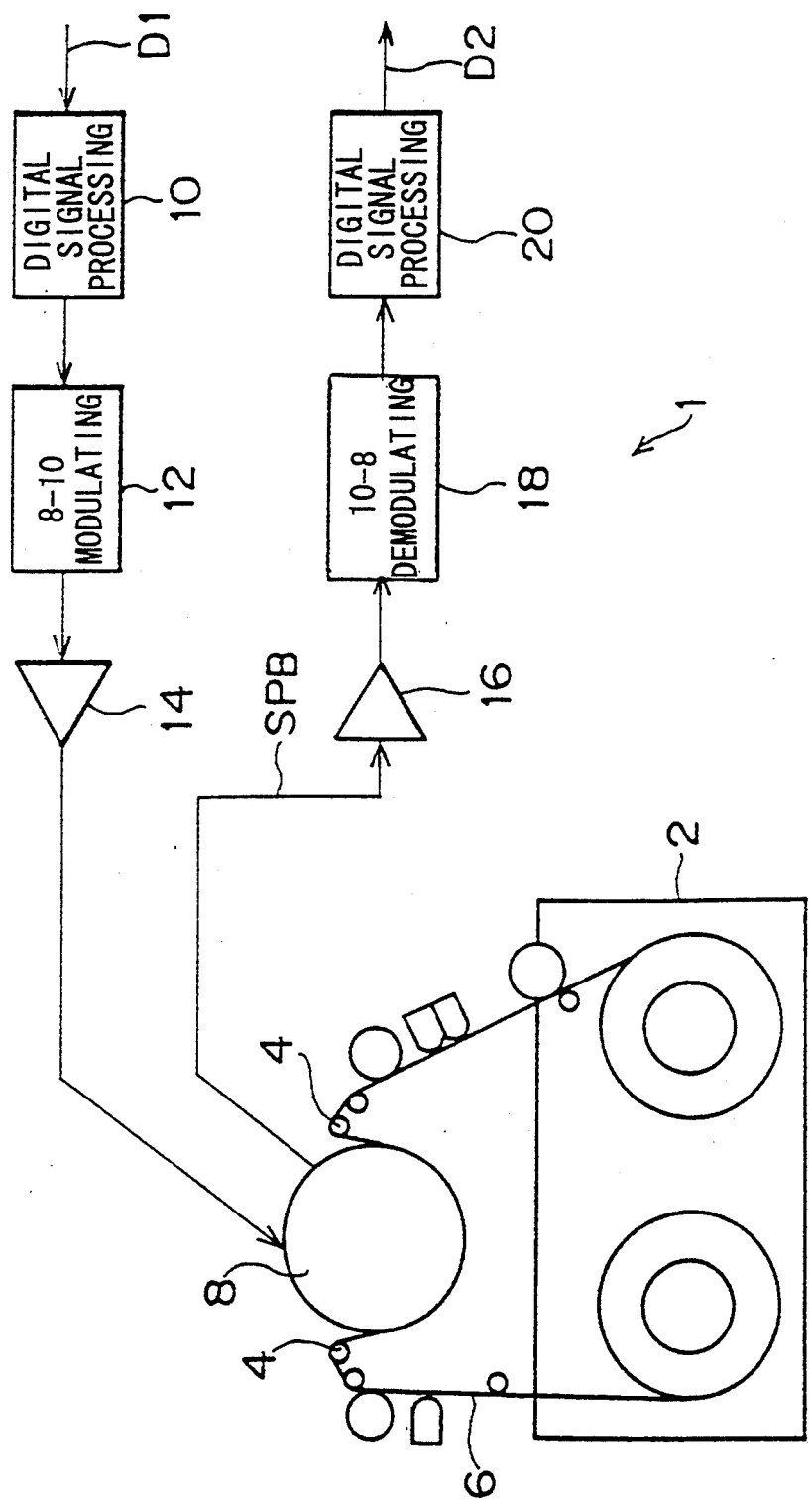
FIG. 1 is a block diagram showing a conventional magnetic recording and/or reproducing apparatus.
Figure 2A:
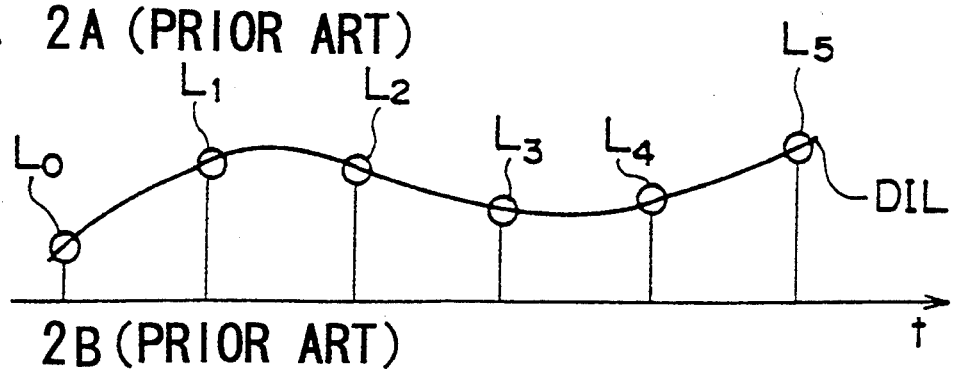
FIGS. 2A and 2B are signal waveform diagrams illustrating the layout of the conventional audio data.
Figure 2B:
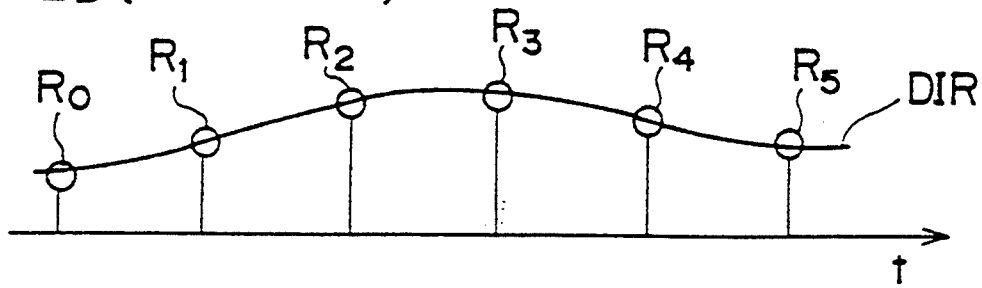
Figure 3:
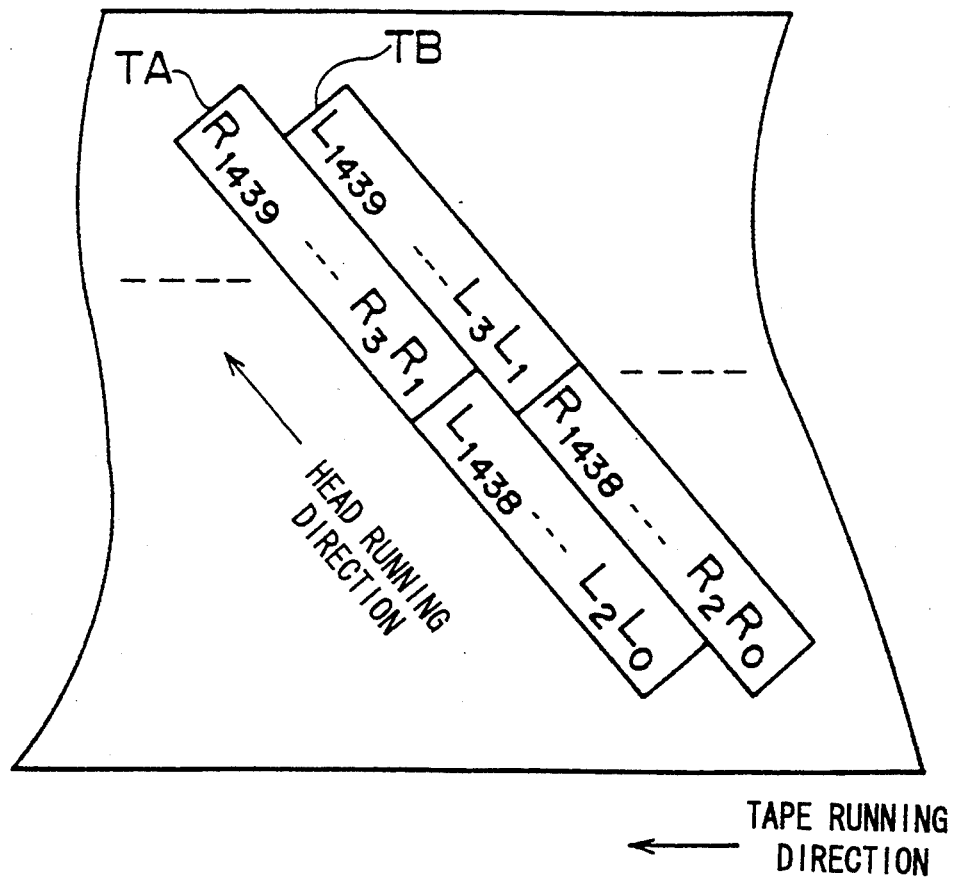
FIG. 3 is a schematic diagram showing the layout of data on the conventional magnetic tape.
Figure 4:
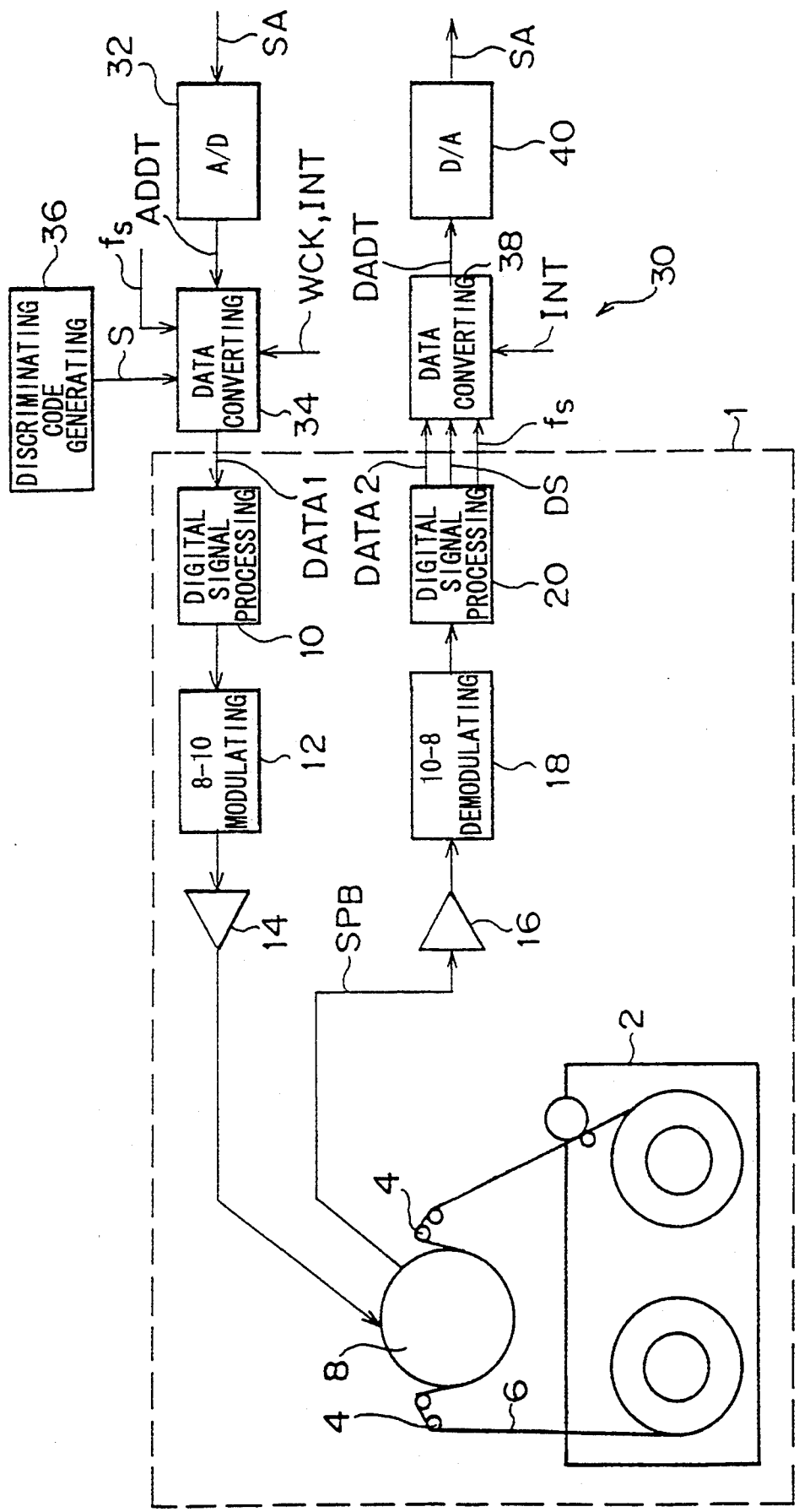
FIG. 4 is a block diagram showing the first embodiment of a magnetic recording and/or reproducing apparatus according to this invention.

FIG. 4 shows an embodiment of this invention. In FIG. 4, a broken line portion is the same as the digital audio tape recorder 1 of FIG. 1.

In FIG. 4, 30 generally shows a magnetic recording and/or reproducing apparatus, wherein a digital audio tape recorder 1 is operated at a speed twice as fast as the standard speed.

Namely, in the magnetic recording and/or reproducing apparatus 30, the rotating speed of the rotary drum 8 is set to 4,000 [rpm] which is twice as fast as the standard speed, and the running speed of a magnetic tape 6 is also set to a speed twice as fast as the standard tape speed.

Furthermore, in the magnetic recording and/or reproducing apparatus 30, by doubling the frequency of a reference clock signal for operation, in the operation of a digital signal processing circuit 10, an 8–10 modulating circuit 12, a 10-8 demodulating circuit 18, and a digital signal processing circuit 20, processing speed is switched to a speed twice as fast as the standard processing speed.

In the magnetic recording and/or reproducing apparatus 30, the data transfer speed in the digital audio tape recorder 1 is set to twice the standard one, and a long bit-length digital audio signal can be recorded and reproduced accordingly, compared with ordinary digital audio tape recorders.

In the magnetic recording and/or reproducing apparatus 30, a two-channel audio signal SA is input to an analog-to-digital converting circuit 32 where they are converted into a 20-bit digital audio signal at a sampling frequency selected by the user.

Thereby, as shown in FIGS. 5A to 5F, if the user selects a sampling frequency of 44.1 [kHz] out of sampling frequencies of 32 [kHz], 44.1 [kHz], and 48 [kHz], the analog-to-digital converting circuit 32 samples the audio signal SA with respect to a sampling signal $S_f$ (FIG. 5A) of this sampling frequency, and outputs a digital audio signal ADDT (FIG. 5B) in which left-channel audio data (designated "L") and then right-channel audio data (designated "R") are sequentially linked.

A data converting circuit 34 divides the 20-bit, two-channel digital audio data into upper bits and lower bits at a clock WCK (FIG. 5C) which changes its level at a rate twice as fast as the sampling frequency $S_f$, and outputs the upper-bit data and the lower-bit data with predetermined data added. The data converting circuit 34 thus provides recording data DATA1 (FIG. 5D) which have a clock frequency twice that of the audio frequency ADDT, and in which 16-bit audio data are continuous.

Figure 6A:
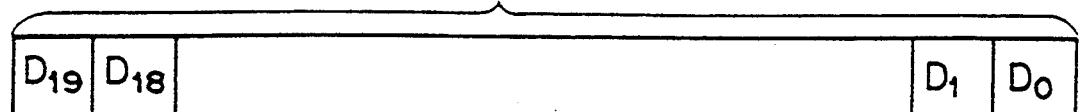
FIGS. 6A to 6C are schematic diagrams explaining division of audio data of this invention.
Figure 6B:
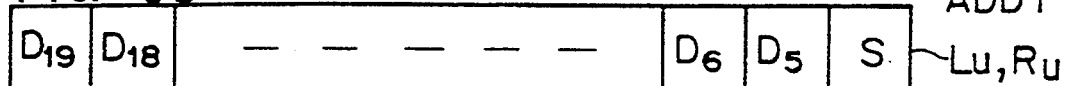
Figure 6C:
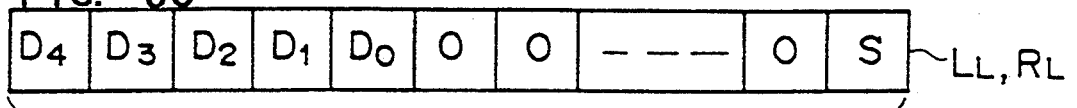

More specifically, as shown in FIGS. 6A to 6C, the data converting circuit 34 converts the 20-bit audio data ADDT (FIG. 6A) into upper 15 bit data (FIG. 6B) and lower 5 bit data (FIG. 6C).

The data converting circuit 34 appends a discriminating bit S to the least significant bit of the upper 15 bit data, thereby forming 16-bit audio data $L_U$ and $R_U$.

The data converting circuit 34 arranges then the lower 5 bit data as the upper 5 bits, appends a discriminating bit S to the least significant bit, and arranges zero-value blank data to the middle bits, thereby forming the 16-bit audio data $L_L$ and $R_L$.

A discriminating code generating circuit 36 generates in its upper bit and lower bit, respective discriminating data S (FIG. 5E), a logic "1" and a logic "0". The data converting circuit 34 assigns these discriminating data DSS to discriminating bits of the audio data $L_U$ and $R_U$.

In the reproducing mode, the magnetic recording and/or reproducing apparatus 30 differentiates between the upper bits of the audio data and the lower bits of the audio data using the discriminating bit DS.S so that 20-bit audio data are reconstructed.

The data converting circuit 34 outputs in a predetermined sequence the upper and lower audio data, $L_U$, $R_U$, $L_L$, and $R_L$ arranged as above, and these audio data are allocated to designated areas of each recording track in a manner that two pairs of recording tracks are handled as a unit.

Figure 7:
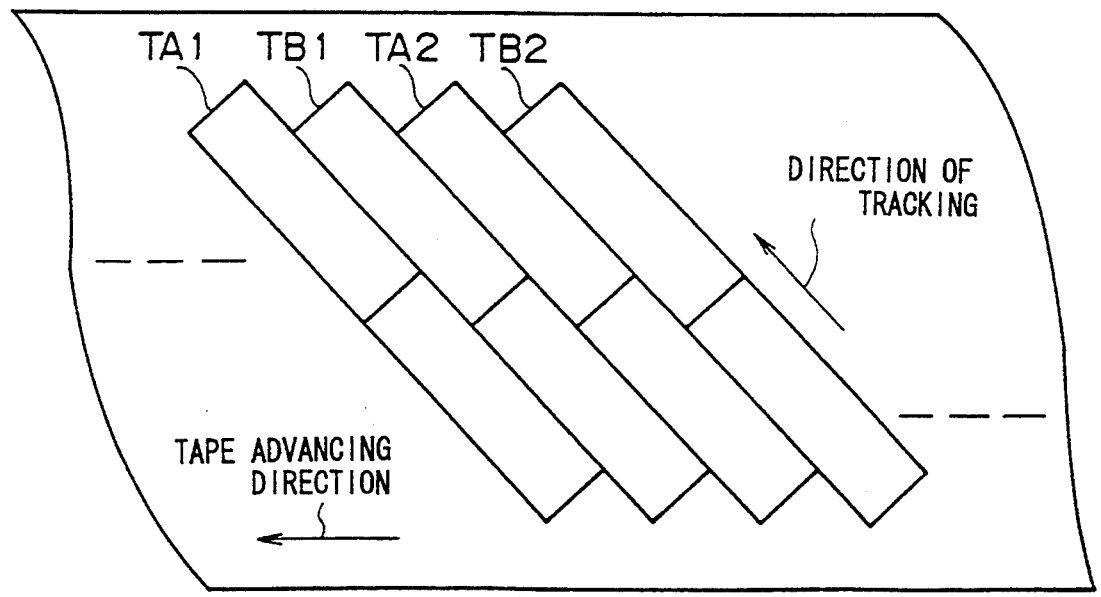
FIG. 7 is a schematic diagram showing the layout of data on a magnetic tape of this invention.

More specifically, as shown in FIG. 7, the data converting circuit outputs audio data $L_U$, $R_U$, $L_L$, and $R_L$ in a manner that left-channel upper-bit data are allocated to the scan start side area of a first recording track TA1 having a positive azimuth angle, and then right-channel lower-bit data to the scan end side area of the first recording track in succession to the scan start side area.

Next, in the second recording track TB1 having a negative azimuth angle, the data converting circuit 34 outputs audio data $L_U$, $R_U$, $L_L$, and $R_L$ in a manner that the right-channel upper-bit data are allocated to the scan start side area, and left-channel lower-bit data are allocated to the scan end side area in succession to the scan start side area.

In the third recording track and the fourth recording track following the first and second tracks, the data converting circuit 34 outputs audio data $L_U, R_U, L_L,$ and $R_L$ in a manner that the upper bit data and the lower bit data are reversed. Namely, left-channel lower-bit data and right-channel lower-bit data are allocated respective scan start side areas, and right-channel upper-bit data and left-channel upper-bit data are allocated to respective scan end side areas.

Based on the sampling frequency $f_S$, the data converting circuit 34 thus sequentially outputs audio data $L_U, R_U, L_L,$ and $R_L$ in the predetermined sequence in the period twice the interleave period of the digital audio tape recorder 1 (in this case, the digital audio tape recorder 1 operates in a period of 30 [msec], twice its normal speed).

Receiving the audio data of 1,440 words in a period of 30 [msec] with the sampling frequency $f_S$ of 48 [kHz], the data converting circuit 34 outputs the audio data sequentially, word by word, the left-channel upper-bit data, the right-channel upper-bit data, the left-channel lower-bit data, the right-channel lowerbit data, and so on, for a first duration of 15 [msec] starting at each rising edge of the reference signal INT (FIG. 5F), in the interleave period of the digital audio tape recorder 1.

For a next duration of 15 [msec], the data converting circuit 34 outputs the audio data sequentially, word by word, with the upper bits and the lower bits arranged in reverse sequence as follows: the left-channel lower-bit data, the right-channel lower-bit data, the left-channel upper-bit data, the right-channel upper-bit data, ...

As shown in FIGS. 8A to 8E, the digital audio tape recorder 1 interleaves the sequentially fed audio data at a processing speed twice the standard speed, and sequentially records the interleaved audio data along with an error correcting code in a format which is standardized for the digital tape recorder 1. When the sampling frequency $f_S$ is 48 [kHz], in word 0 through word 719 for the first 15 [msec] out of the audio data of 1,440 words (FIG. 8A) corresponding to the 30 [msec] period, the left-channel upper bits and the right-channel lower bits are recorded to respective scan start side areas of the first recording track TA1 and the second recording track TB1 (FIGS. 8B and 8C), followed by the recording of error correcting codes Q in succession, the right-channel lower bits and the left-channel lower bits are recorded on respective scan end side areas.

Further, as for the succeeding audio data consisting of word 720 through word 1,439, the left-channel lower bits and the right-channel lower bits are recorded on respective scan start side areas of the third recording track TA2 and the fourth recording track TB2 (FIGS. 8D and 8E), followed by the recording of error correcting codes Q. In succession, the right-channel upper bits and the left-channel upper bits are recorded on respective scan end side areas.

FIGS. 9A to 9E show the case where the sampling frequency $f_S$ is 44.1 [kHz].

Receiving the audio data of 1,323 words in a period of 30 [msec] with the sampling frequency $f_S$ of 44.1 [kHz], the data converting circuit 34 outputs the audio data sequentially, word by word, the left-channel upper-bit data, the right-channel upper-bit data, the left-channel lower-bit data, the right-channel lower-bit data, and so on, for a first duration of 15 [msec]. For the last moment of the first duration of 15 [msec], the data converting circuit 34 outputs the left-channel upper bits and the right-channel upper bits of the audio data of the word 661.

The data converting circuit 34 outputs the audio data consisting of the left-channel lower bits and the right-channel lower bits of the word 661 at a next rising edge of the reference signal INT, and then outputs each word of the audio data, sequentially word by word in the sequence the left-channel upper bits, the right-channel upper bits, the left-channel lower bits, the right-channel lower bits, ....

When the sampling frequency $f_S$ is 44.1 [kHz], the audio data of 1,323 words results in a period of 30 [msec]. Thus, dividing the number of the sampled values into two by an integer is impossible, and allocating the audio data in a word to two pairs of recording tracks is thus impossible.

The magnetic recording and/or reproducing apparatus 30 therefore divides the audio data of the word 661 into upper bits and lower bits, in which divided bits is recorded to the first and second recording tracks TA1 and TA2 and the third and fourth recording tracks.

When the sampling frequency is 48 [kHz], the data converting circuit 34 interchanges the upper bits with the lower bits in a second half interleave period, reversing the sequence in a first half interleave period. When the sampling frequency is 44.1 [kHz], however, the upper bits and the lower bits of the audio data are sequentially output without reversing the sequence, but the audio data of the word 661 is divided into two, with one allocated to a first interleave period and the other allocated to a second half interleave period.

When the sampling frequency $f_S$ is 44.1 [kHz], in the digital audio tape recorder 1, the left-channel upper bits and the right-channel upper bits of the word 0 through the word 661 out of the 1,323 words (FIG. 9A) of the 30 [msec] period are recorded onto the scan start side areas of the first and second recording tracks TA1 and TB1 (FIGS. 9B and 9C), followed by the recording of error correcting codes Q. In succession, the right-channel lower bits and the left-channel lower bits of the audio data of the word 0 through word 660 are recorded to respective scan end side areas.

Further, the left-channel lower bits and the right-channel lower bits of the audio data consisting of the word 661 through the word 1,322 are recorded onto respective scan start side areas of the next third and fourth recording tracks TA2 and TB2 (FIGS. 9D and 9E), followed by the recording of the error correcting codes Q. In succession, the right-channel upper bits and the left-channel upper bits of the audio data consisting of the word 662 through the word 1,322 are recorded to respective scan end side areas.

The audio data are divided into the upper bits and the lower bits, and the upper bits and the lower bits are recorded respectively onto the scan start side area and the scan end side area, and the upper bit and the lower bit recordings are interchanged between the scan start side area and the scan end side area. In the event that one magnetic head fails to output a reproducing signal, or in the event that the magnetic tape 6 suffers scratches along its length, 16 bits out of 20 bit audio data can be recovered. The recovered data may be interpolated, preventing generation of abnormal sound.

The magnetic recording and/or reproducing apparatus 30 is thus easy to use without exercising too much care.

In the reproducing mode, the digital audio tape recorder 1 processes reproducing data by reversing the steps taken in the recording mode, and thus, the digital signal processing circuit 20 outputs sequentially the upper bits and then the lower bits of audio data DATA2 in the sequence taken for recording.

The digital signal processing circuit 20 extracts the information of a sampling frequency from sub-data, and outputs this sampling frequency information $f_S$ along with the audio data DATA2 to the data converting circuit 38.

Based on the sampling frequency information $f_S$, the data converting circuit 38 recovers the original audio data by linking the upper bits of the audio data with the corresponding lower bits of the audio data using discriminating data DS. Recovered audio data DADT are output to a digital-to-analog converting circuit 40.

Specifically, when the sampling frequency is 48 [kHz], the data converting circuit 38, on receiving audio data with its discriminating bit S being the logic "1" at a rising edge of the reference signal INT, recovers 20-bit audio data for a duration that continues until a next rising edge of the reference signal INT, by linking the audio data with its discriminating bit S being the logic "1" with audio data incoming with a delay of 2 clock cycles and with its discriminating bit S being the logic "0".

When the sampling frequency is 48 [kHz], the data converting circuit 38, on receiving audio data with its discriminating bit S being the logic "0" at a rising edge of the reference signal INT, recovers 20-bit audio data for a duration that continues to until a next rising edge of the reference signal INT, by linking the audio data with its discriminating bit S being the logic "1" with audio data incoming with a delay of 2 clock periods and with its discriminating bit S being the logic "0".

With the sampling frequency being 44.1 [kHz], the data converting circuit 38 recovers 20-bit audio data by linking the audio data with its discriminating bit S being the logic "1" with audio data incoming with a delay of 2 clock cycles and with its discriminating code S being the logic "0".

The data converting circuit 38 interpolates as necessary the 20-bit audio data with the 16-bit audio data, based on the error correcting results provided by the digital signal processing circuit 20, and outputs the interpolated data. This prevents generation of abnormal sound in the event that the magnetic tape 6 suffers large scratches along its length.

The magnetic recording and/or reproducing apparatus 30 then reproduces a high-quality audio signal SA through the digital-to-analog converting circuit 40.

The above embodiment relates to a recording and reproducing method at various sampling frequencies in a normal reproducing mode. However, the case is also considered where the user wants to review or rewind a tape while listening to the sound. In this case, when the user presses the switch for variable speed reproducing, the magnetic recording and/or reproducing apparatus 30 is set to a variable speed reproducing lode, switching tape running speed and processing a reproducing signal sequentially being reproduced.

The data converting circuit 38 selectively picks up audio data having its discriminating bit, namely, its least significant bit, being the logic "1", out of the audio data DATA2 provided by the digital signal processing circuit 20, and thus selectively receives the upper bits of the audio data, which are then output to be used as audio data for a monophonic system.

Figures 10, 11A, 11B, 11C:
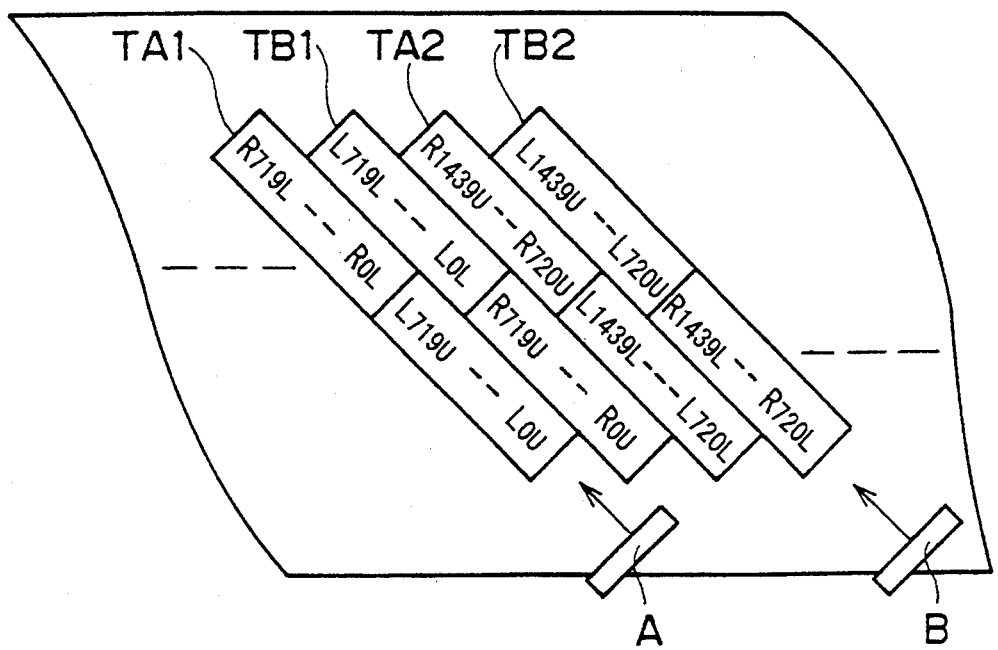
FIG. 10 is a schematic diagram explaining cue reviewing in a variable speed reproducing.
FIGS. 11A to 11C are schematic diagrams explaining the division of audio data according to the second embodiment.

In FIG. 10, in the variable speed reproducing mode, since magnetic heads A and B discretely scan continuous recording tracks, all the tracks are not available for complete audio data reproducing.

Since audio data are divided into the upper bits and the lower bits for recording in this embodiment, the variable speed reproducing mode causes 20-bit audio data, even if only part of it, to be subjected to difficulty in reproducing. If audio signal SA is output in the form of a 20-bit audio data, the reproduced sound will be almost unintelligible.

In the long bit-length audio data, the loss of upper bits degrades sound more than the loss of the lower bits.

In such a variable speed reproducing mode, even when the 20-bit audio data are not fully reproduced, the upper bits of the audio data are still reproduced in either the left-channel or the right-channel with almost no interruptions.

The data converting circuit 38 selectively receives the upper bits of audio data in the variable speed reproducing mode, and appends lower bits set at a predetermined level to the upper bits of the audio data to provide 20-bit audio data, and outputs the resulting audio data as the left- and right-channel audio data.

The magnetic recording and/or reproducing apparatus 30 allows cue review operation to be executed in the variable speed reproducing mode even when long bit-length audio data are divided into the upper bits and the lower bits before they are recorded.

According to the arrangement mentioned above, 20-bit audio data are divided into the upper 15 bit data and the lower 5 bit data, with a discriminating bit appended to each of the upper 15 bit data and the lower 5 bit data, and both upper bit data and the lower bit data with respective discriminating bit are then recorded. The upper bits and the lower bits are allocated to scan start side areas and scan end side areas of four recording tracks in an alternate manner. High-quality audio sound is thus recorded and reproduced in an easy and reliable manner.

(2) Second Embodiment

In the second embodiment, 20-bit audio data are recorded and reproduced using sub-code data for differentiating between upper bits and lower bits.

In this embodiment shown in FIGS. 11A to 11C, as in the first embodiment, a digital audio tape recorder 1 which processes sequentially 16 bit audio data (FIG. 11A) is run at a processing speed twice the normal speed, and 20-bit audio data are fed to the digital audio tape recorder 1 through the data converting circuit (FIG. 11B).

The data converting circuit divides the 20-bit audio data into the upper 16 bits and the lower 4 bits, and outputs these audio data to the digital audio tape recorder 1 in the same sequence as the first embodiment.

In this embodiment, right-channel and left-channel, upper bits and lower bits of audio data are recorded to designated areas according to the sampling frequency in the same manner as in the first embodiment.

Figure 12A:
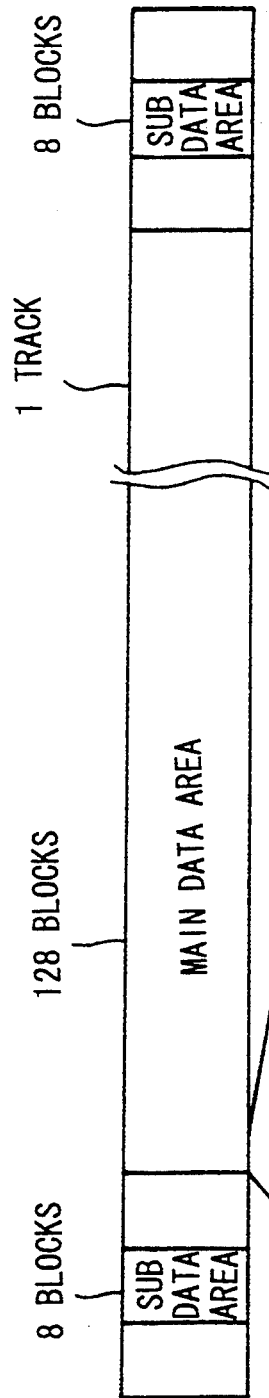
FIGS. 12A to 12C are schematic diagrams explaining sub-code data.
Figure 12B:
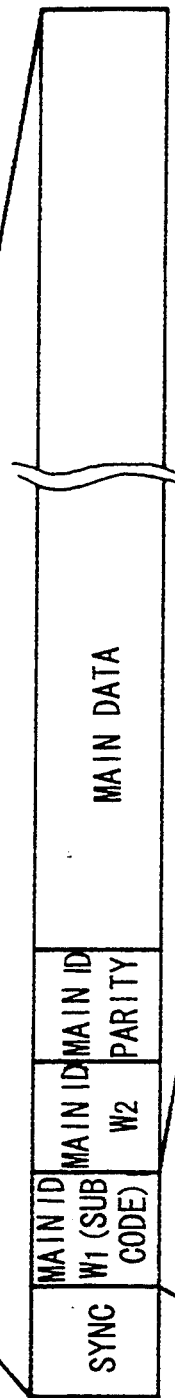
Figure 12C:
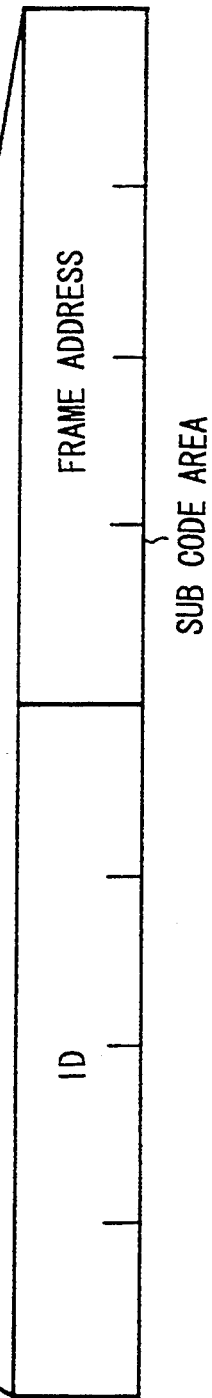

In this sort of digital audio tape recorder 1 shown in FIGS. 12A to 12C, when audio data are recorded on a recording track, the audio data are recorded on a main data area with a sub-data area formed on each of both sides of the main data area (FIG. 12A).

The main data area is divided into 128 blocks. Recorded to each block are an eight bit synchronizing data (designated "SYNC"), a first main ID and a second main ID (respectively $W_1$ and $W_2$), and a main ID made of a parity code, and main data made of audio data (FIG. 12B).

In the even-numbered address blocks, the first four bits of the first main $IDW_1$ are allocated for ID, by which the sampling frequency and time information are recorded. The succeeding four bits are allocated to a frame address (FIG. 12C).

Figure 13A:
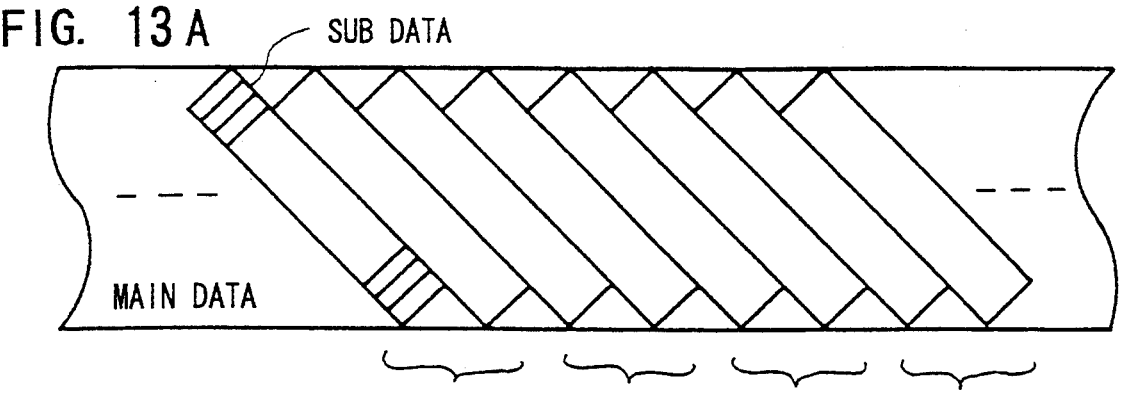

As shown in FIGS. 13A to 13C, the frame address cycles from the value channel, 0 to the value channel, 15 (FIG. 13B) at steps of a pair of neighboring recording tracks (FIG. 13A). In this embodiment, the least significant bit of the frame address is utilized as discriminating data to be used to differentiate between the upper bits and the lower bits of audio data.

When the least significant bit is the logic "1", the frame number is judged to be "1" in the data converting circuit. When the least significant bit is the logic "0", the frame number is judged to be "1" (FIG. 13C). A recording track with its frame number being the value "0" and another recording track in succession with its frame number being the value "1" are handled as a unit. In the same sequence as that in the first embodiment, the upper bit audio data and the lower bit audio data are sequentially output.

In the embodiment during reproducing operation, audio data is recovered back to its original sequence based on the frame address reproduced by the digital audio tape recorder 1.

Figure 14A:
FIGS. 14A to 14D are schematic diagrams explaining reproducing processing.
Figure 14B:
Figure 14C:
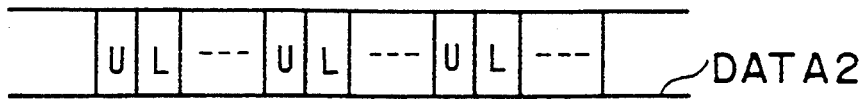

Specifically in the magnetic recording and/or reproducing apparatus shown in FIGS. 14A to 14C, the data converting circuit receives from the digital audio tape recorder 1 a reference signal INT which has a rising edge in signal level in synchronization with the interleave period (FIG. 14A), and based on the reference signal INT, a reference signal EXSY (FIG. 14B) is produced which changes its signal level at a period twice as long as the interleave period.

Figure 14D:
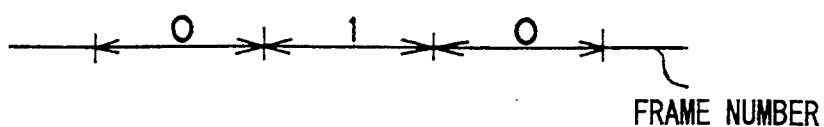

From the audio data DATA2 (FIG. 14C) provided by the digital audio tape recorder 1, the frame address based on the reference signal INT and the reference signal EXSY can be judged for frame number (FIG. 14D). According to the sampling frequency and the judgment result, the original audio data are recovered.

The frame address may be used as a discriminating data in FIGS. 13A to 13C, and this offers the same advantage as in the first embodiment.

(3) Third Embodiment

In this embodiment shown in FIGS. 18A to 18D, the sequence of audio data from the data converting circuit to the digital audio tape recorder 1 is rearranged in recording and reproducing 20-bit audio data in the same way as the first and second embodiments.

Further in this embodiment, the digital audio tape recorder 1 which processes sequentially 16 bit audio data (FIG. 15A) is run at a processing speed twice the standard speed in the same manner as the first embodiment, and 20-bit audio data are fed to the digital audio tape recorder 1 through the data converting circuit (FIG. 15B).

The data converting circuit divides 20-bit audio data into upper 16 bits and lower 4 bits, and outputs these divided audio data to a digital audio tape recorder 1 in a manner that allows the upper bits are continued by the lower bits at each channel.

As shown in FIGS. 16A to 16E, when the sampling frequency is 48 [kHz], the data converting circuit outputs the converted data DATA1 (FIG. 16A) in which each of left-channel data and right-channel data is sequentially arranged in an alternating manner for a first 15 [msec] duration out of audio data of 1,440 words having a period of 30 [msec], with upper bits and lower bits in succession in each channel data.

For the succeeding 15 [msec] duration, the data converting circuit outputs converted data DATA1 in which each of right-channel data and left-channel data are sequentially arranged in an alternating manner but this time in the reverse sequence such that the right-channel data appears first, followed by the left-channel, with upper bits and then lower bits in succession in each channel data.

In this embodiment, in the word 0 through the word 719 making up the audio data for the first 15 [msec] duration, the left-channel upper bits and lower bits are recorded respectively onto the scan start side area of a first recording track TA1 and the scan start side area of a second recording track TB2 (FIGS. 16B and 16C). In succession, error correcting codes Q are recorded, followed by the right-channel lower bits and upper bits onto respective scan end side areas.

As for the succeeding audio data consisting of the word 720 through the word 1,439, the right-channel upper bits and lower bits are recorded on respective scan start side areas of the third recording track TA2 and the fourth recording track TB2 (FIGS. 16D and 16E), followed by the recording of error correcting codes Q. In succession, the left-channel lower bits and upper bits are recorded on respective scan end side areas.

As shown in FIGS. 17A to 17E, when the sampling frequency is 44.1 [kHz], the data converting circuit outputs the converted data DATA1 (FIG. 17A) in which each of left-channel data and right-channel data are sequentially arranged in an alternating manner for a first 15 [msec] duration out of audio data of 1,323 words having a period of 30 [msec], with upper bits and lower bits in succession in each channel data.

As for the audio data of the word 661, the data converting circuit outputs the audio data DATA1 by allocating the left-channel audio data to a first 15 [msec] duration of the interleave period and the right-channel audio data to a next 15 [msec] duration of the interleave period.

For a next duration of 15 [msec], in succession to the right-channel audio data of the word 661, the data converting circuit outputs sequentially the left-channel upper bit and lower-bit data, and the right-channel upper bit and lower bit data in an alternate manner.

In this embodiment, when the sampling frequency $f_S$ is 44.1 [kHz], the magnetic recording and/or reproducing apparatus records the left-channel upper bits and lower bits of each of the word 0 through the word 661 of the audio data respectively onto the scan start side area of the first recording track TA1 and the scan start side area of the second recording track TB1 (FIGS. 17B and 17C), then records error correcting codes Q, and then the right-channel lower bits and upper bits of each of the word 0 through the word 660 of the audio data onto respective scan end side areas next to the scan start side areas.

The magnetic recording and/or reproducing apparatus records the right-channel upper bits and lower bits of each of the word 661 through the word 1,322 of the audio data respectively onto the scan start side area of the third recording track TA2 and the scan start side area of the fourth recording track TB2 (FIGS. 17D and 17E), then records error correcting codes Q, and then the left-channel lower bits and upper bits of each of the word 662 through the word 1,322 of the audio data onto respective scan end side areas next to the scan start side areas.

Even when audio data output is alternated between the right channel and the left channel, the audio data can be divided into the upper bit data and the lower bit data, both data of which are recorded onto the scan start side areas and the scan end side area on an alternating basis. Thus, 20-bit audio data is recorded and then reproduced in an easy and reliable manner.

In this embodiment, like the second embodiment, the frame address may be used to differentiate between the upper bits and the lower bits. During the reproducing operation, 20-bit audio data can thus be reproduced.

As shown in FIGS. 18A to 18D which correspond to FIGS. 14A to 14D, the magnetic recording and/or reproducing apparatus generates a reference signal EXSY (FIG. 18B) based on a reference signal INT (FIG. 18A). The frame address based on the reference signal INT and the reference signal EXSY can be judged for the frame number of the audio data DATA2 (FIGS. 18C and 18D). According to the sampling frequency and the judgment result, the original audio data is reproduced.

Even if the audio data are arranged as in FIGS. 15A to 15C, the audio data may be divided into the upper bit data and the lower bit data, both data of which are recorded onto the scan start side area and the scan end side area on an alternating basis. Thus, 20-bit audio data are recorded and then reproduced in an easy and reliable manner.

(4) Fourth Embodiment

In the first embodiment through the third embodiment, in the variable speed reproducing mode, degradation of sound quality can be reduced by selectively reproducing audio data upper bits only.

The first embodiment through the third embodiments still suffer a disadvantage that uncomfortable sound output results because the upper bits of audio data are discretely reproduced.

In this embodiment, audio data, before recording, is allocated as shown in FIG. 19 in order to reduce degradation of sound quality in the variable speed reproducing mode.

Furthermore, in this embodiment, audio signal is sampled at a sampling rate of 24 bits, and thus high-quality audio signal is recorded and reproduced compared with the first embodiment through the third embodiment.

Figure 20:
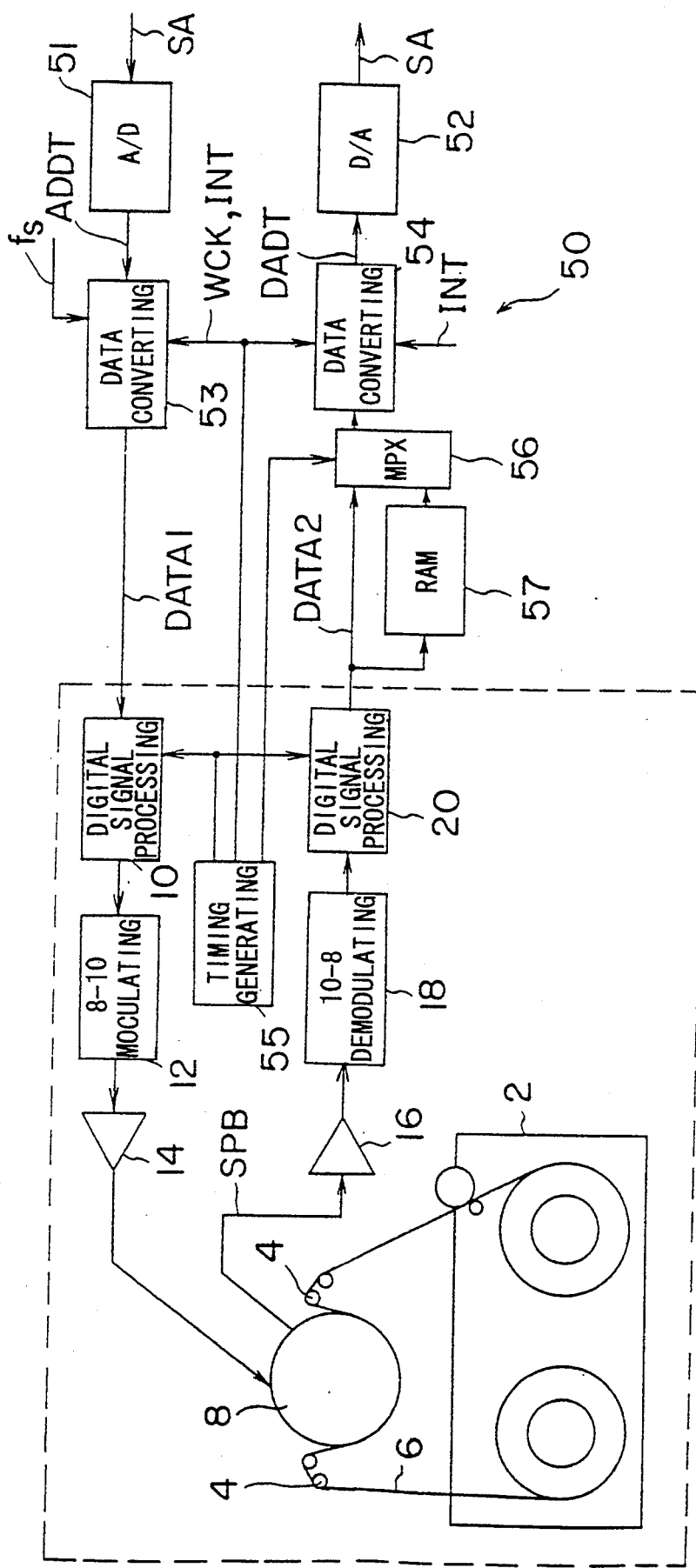
FIG. 20 is a block diagram showing the magnetic recording and/or reproducing apparatus.

As FIG. 20 is generally similar to FIG. 4, the same reference numerals are used to denote similar features. A magnetic recording and/or reproducing apparatus, generally designated 50, causes a digital audio tape recorder 1 to run at a operation speed twice as fast as the standard speed.

In the magnetic recording and/or reproducing apparatus 50, an analog-to-digital converting circuit 51 converts two-channel audio signal SA into a 24-bit digital audio signal at the sampling frequency the user selects, and a digital-to-analog converting circuit 52 converts a 24-bit digital audio signal into an analog signal.

For example, if the user selects a sampling frequency of 44.1 [kHz] from the sampling frequencies of 32 [kHz], 44.1 [kHz] and 48 [kHz], the analog-to-digital converting circuit 51 samples the audio signal SA with respect to a sampling signal $S_f$ (FIG. 21A) of this sampling frequency, and outputs a digital audio signal ADDT (FIG. 21B) in which left channel audio data and right channel audio data are continuous.

A data converting circuit 53 divides the 24-bit, two-channel digital audio data into upper bits and lower bits at a clock WCK (FIG. 21C) provided by a timing generating circuit 55, and outputs the lower bits with predetermined data added. The data converting circuit 53 thus provides recording data DATA1 (FIG. 21D) which has a clock frequency twice that of the audio frequency ADDT, and in which 16 bit audio data $L_U$, $R_U$, $L_L$, and $R_L$ are continuous.

More specifically, as shown in FIGS. 22A to 22C, the data converting circuit 53 converts the 24-bit audio data ADDT (FIG. 22A) into upper 16 bit data, $L_U$ and $R_U$ (FIG. 22B) and lower 8 bit data (FIG. 22C).

As for the lower 8 bit data, the data converting circuit 53 arranges then the lower 8 bit data as the upper bits, and appends zero-value blank data to the remaining lower bits, thereby forming the 16-bit audio data $L_L$ and $R_L$.

The data converting circuit 53 outputs in a predetermined sequence the upper and lower audio data $L_U$, $R_U$, $L_L$, and $R_L$ arranged as above, and these audio data are allocated to designated areas of each recording track in a manner that two pairs of recording tracks are handled as an unit.

More specifically, as shown in FIG. 19, the data converting circuit 53 outputs audio data $L_U$, $R_U$, $L_L$, and $R_L$ in a manner that the left-channel upper-bit data are allocated to the scan start side area of a first recording track TA1 having a positive azimuth angle, and then the right-channel upper-bit data to the scan end side area of the first recording track in succession to the scan start side area.

Next, in the second recording track TB1 having a negative azimuth angle, the data converting circuit 53 outputs audio data $L_U$, $R_U$, $L_L$, and $R_L$ in a manner that the right-channel lower-bit data are allocated to the scan start side area, and the left-channel lower-bit data are allocated to the scan end side area in succession to the scan start side area.

In a third recording track and a fourth recording track in succession to the first and second tracks, the data converting circuit 53 outputs audio data $L_U$, $R_U$, $L_L$, and $R_L$ in a manner that the upper bit data and the lower bit data are interchanged. Namely, the left-channel lower-bit data and the right-channel upper-bit data are allocated to respective scan start side areas, and the right-channel lower-bit data and the left-channel upper-bit data are allocated to respective scan end side areas.

Based on the sampling frequency $f_S$, the data converting circuit 53 thus sequentially outputs audio data $L_U$, $R_U$, $L_L$, and $R_L$ in the predetermined sequence in the period twice the interleave period of the digital audio tape recorder 1.

Based on the frame address FD (FIG. 21E) of the digital audio tape recorder 1 and a reference signal INT (FIG. 21F) which rises in its level in synchronization with the interleave period, the data converting circuit 53 outputs sequentially audio data $L_U$, $R_U$, $L_L$, and $R_L$.

As shown in FIGS. 23A to 23G, receiving the audio data ADDT (FIG. 23A) of 1,440 words in a period of 30 [msec] with the sampling frequency $f_S$ of 48 [kHz], the data converting circuit 53 outputs the audio data sequentially, word by word, the left-channel upper-bit data, the right-channel lower-bit data, the left-channel lower-bit data, the right-channel upper-bit data, and so on, for a first duration of 15 [msec] (FIG. 23B).

For a next duration of 15 [msec], the data converting circuit 53 outputs the audio data sequentially, word by word, with the upper bits and the lower bits arranged in the sequence with the upper bits and the lower bits interchanged, namely, the left-channel lower-bit data, the right-channel upper-bit data, the left-channel upper-bit data, the right-channel lower-bit data, ... (FIG. 23C). The digital audio tape recorder sequentially records the sequentially fed audio data onto the magnetic tape in a standardized format. When the sampling frequency $f_S$ is 48 [kHz], in word 0 through word 719 for the first 15 [msec] out of the audio data of 1,440 words corresponding to the 30 [msec] period, the left-channel upper bits and the right-channel lower bits are recorded to respective scan start side areas of the first recording track TA1 and the second recording track TB1 (FIGS. 23D and 23E), followed by the recording of error correcting codes Q. In succession, the right-channel upper bits and the left-channel lower bits are recorded on respective scan end side areas.

As for the succeeding audio data consisting of the word 720 through the word 1,439, in the digital audio tape recorder 1 the left-channel lower bits and the right-channel lower bits are recorded on respective scan start side areas of the third recording track TA2 and the fourth recording track TB2 (FIGS. 23F and 23G), followed by the recording of error correcting codes Q. In succession, the right-channel lower bits and the left-channel upper bits are recorded on respective scan end side areas.

As shown in FIGS. 24A to 24G, receiving the audio data ADDT (FIG. 24A) of 1,323 words in the period of 30 [msec] with the sampling frequency $f_S$ of 44.1 [kHz], the data converting circuit 53 outputs the audio data sequentially, word by word, the left-channel upper-bit data, the right-channel lower-bit data, the left-channel lower-bit data, the right-channel upper-bit data, and so on, for a first duration of 15 [msec]. For the last moment of the first duration of 15 [msec], the data converting circuit 53 outputs the left-channel upper bits and the right-channel lower bits of the audio data of the word 661.

The data converting circuit 53 outputs the audio data consisting of the left-channel lower bits and the right-channel upper bits of the word 661 at a next rising edge of the reference signal INT, and then outputs each word of the audio data, sequentially word by word, in the sequence of the left-channel upper bits, the right-channel lower bits, the left-channel lower bits, the right-channel upper bits, ... (FIG. 24C).

When the sampling frequency $f_S$ is 44.1 [kHz], the data converting circuit 53 divides the audio data of 1,323 words in the period of 30 [msec] by two to allocate it to two pairs of recording tracks.

When the sampling frequency $f_S$ is 44.1 [kHz], in the digital audio tape recorder 1, the left-channel upper bits and the right-channel lower bits of each of the word 0 through word 661 out of the 1,323 words of the 30 [msec] period are recorded onto the scan start side areas of the first and second recording tracks TA1 and TB1 (FIGS. 23D and 23E), followed by the recording of error correcting codes Q. In succession, the right-channel upper bits and the left-channel lower bits of each of the word 0 through the word 660 of the audio data are recorded to respective scan end side areas.

In the digital audio tape recorder 1, the left-channel lower bits and the right-channel upper bits of the audio data consisting of the word 661 through the word 1,322 are recorded onto respective scan start side areas of the next third and fourth recording tracks TA2 and TB2 (FIGS. 23F and 23G), followed by the recording of the error correcting codes Q. In succession, the right-channel lower bits and the left-channel upper bits of the audio data consisting of the word 662 through the word 1,322 are recorded to respective scan end side areas.

The audio data are divided into the upper bits and the lower bits, and the upper bits and the lower bits are recorded respectively onto the scan start side area and the scan end side area and then in an alternating manner. In the event that one magnetic head fails to output a reproducing signal, or in the event that the magnetic tape 6 suffers scratches along its length, generation of abnormal sound is thus prevented the magnetic recording and/or reproducing apparatus 50 is easy to use without exercising too much care.

When audio data are allocated onto two pairs of recording tracks in this way, the data converting circuit 53 performs data allocation relative to the least significant bit of a frame address. During reproducing operation, the original audio data are thus recovered relative to the frame address.

Specifically, when the frame address is even-numbered, the data converting circuit 53 outputs audio data judging the recording track generated by a magnetic head A having a positive azimuth angle to be the first recording track of the audio data. When the frame address is odd-numbered, the data converting circuit 53 outputs audio data judging the recording track generated by a magnetic head A having a positive azimuth angle to be the third recording track of the audio data.

In reproducing operation, the digital audio tape recorder 1 processes data to be reproduced reversing sequentially the steps taken in recording operation. A digital signal processing circuit 20 outputs the audio data DATA2 sequentially from the upper bits to the lower bits in the sequence taken in the recording operation.

The digital signal processing circuit 20 extracts sampling frequency information from the sub-data, and outputs this sampling frequency information $f_S$ along with the audio data DATA2 to a data converting circuit 54.

The data converting circuit 54 recovers the original audio data by linking the upper bits of the audio data with the corresponding lower bits of the audio data based on the sampling frequency information $f_S$ and the frame address. Recovered audio data DADT are output to the digital-to-analog converting circuit 52.

The magnetic recording and/or reproducing apparatus 50 thus achieves reproduction of high-quality sound SA through the digital-to-analog converting circuit 52.

When the user presses the switch for variable speed reproducing, the magnetic recording and/or reproducing apparatus 50 is set to a variable speed reproducing mode, switching tape running speed and processing a reproducing signal SPB sequentially being reproduced.

Figure 25:
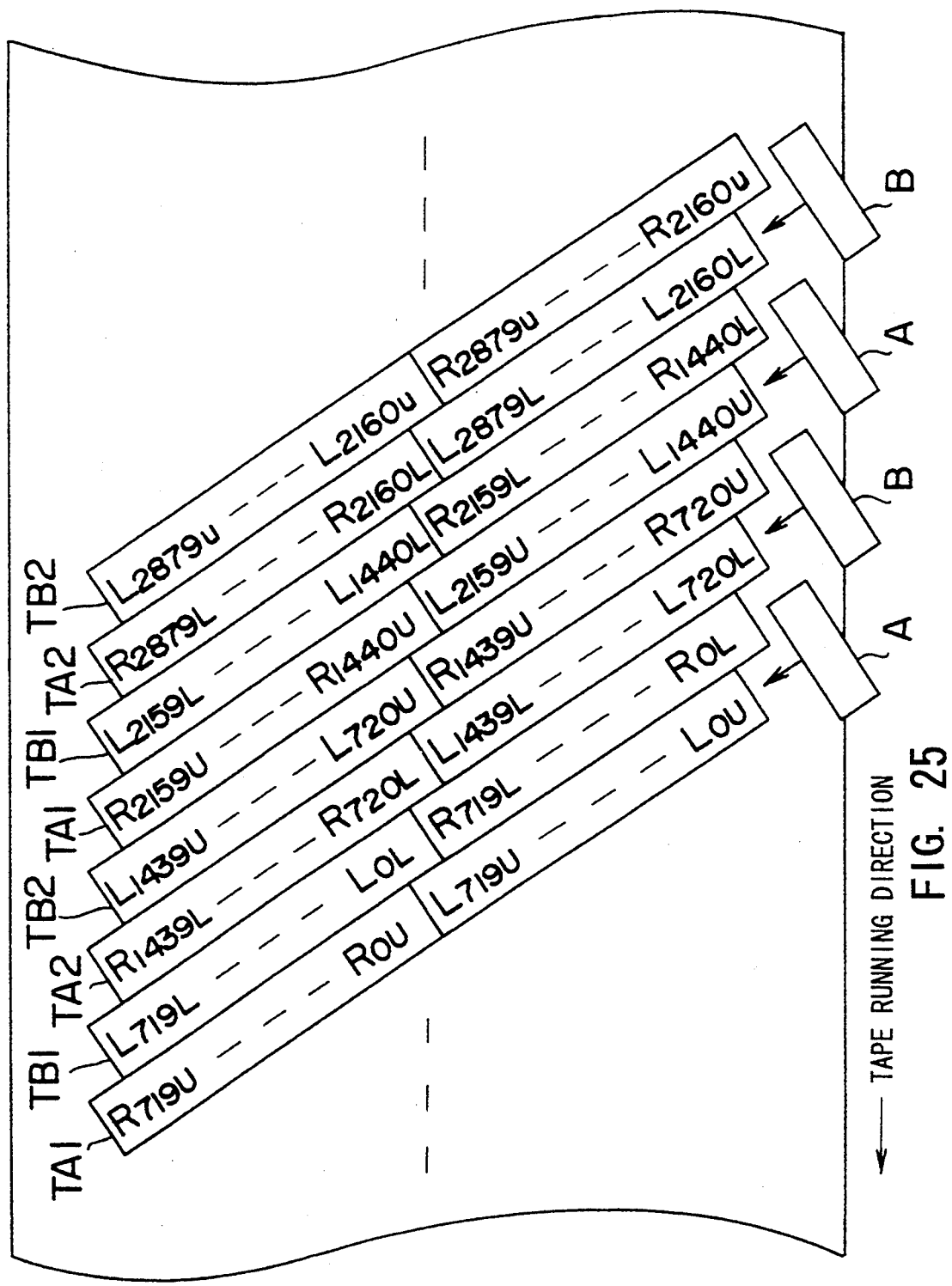
FIG. 25 is a schematic diagram showing scanning of the magnetic head in a double reproducing speed.

As shown in FIG. 25, when the tape running speed for reproduction is doubled in the digital audio tape recorder 1, the first magnetic head A of a positive azimuth angle scans the corresponding recording track TA1, and in succession the second magnetic head B of a negative azimuth angle scans the recording track TA2 of a positive azimuth angle.

When the tape speed for reproducing is set doubled in the digital audio tape recorder 1, a reproducing signal SPB is obtained from only the first recording track TA1 of a positive azimuth angle out of the two pairs of recording tracks.

Figure 26:
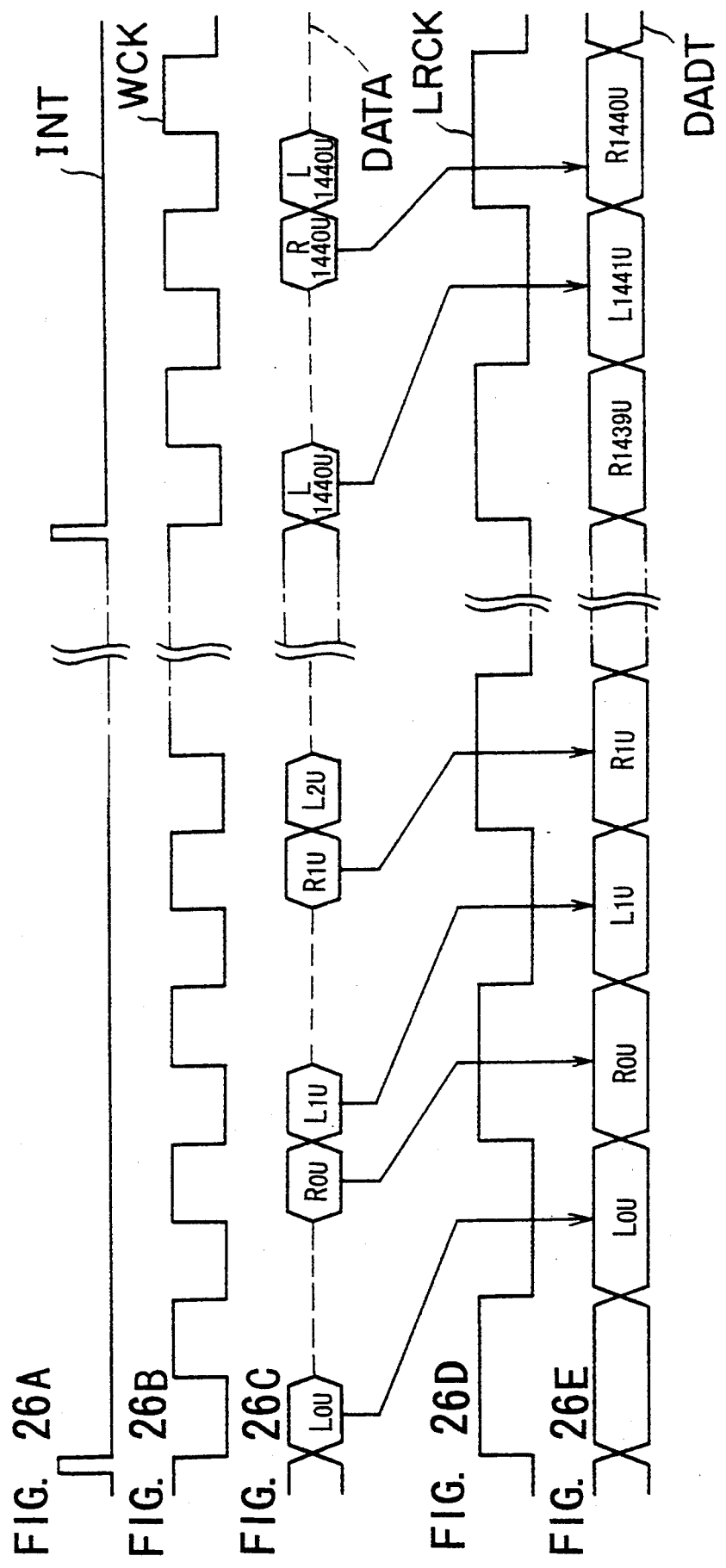
FIGS. 26A to 26E are signal waveform diagrams explaining processing of the reproducing signal.

As seen from FIGS. 26A to 26E, when the tape speed for reproducing is doubled, the digital signal processing circuit 20 provides the audio data DATA2 in which after left-channel upper bit audio data $L_U$ is output in synchronization with the reference signal INT and clock WCK (FIGS. 26A and 26B), meaningless audio data are then given for two clock cycles, and right-channel upper-bit audio data and right-channel upper-bit audio data $R_U$ in succession are output. This sequence is repeated, and the upper bit audio data $L_U$ and $R_U$ only are selectively output (FIG. 26C).

As for the audio data DATA2, the data converting circuit 54, after selectively picking up the upper bit data, reduces to a half the data ratio of the audio data which are picked up in synchronization with a reference signal LRCK (FIG. 26D) having a sampling period of 24-bit audio data and outputs those audio data in the sequence of reception. This arrangement allows discretely reproduced upper bit audio data to be output in a continuous manner (FIG. 26D).

Furthermore, the data converting circuit 54 appends zero-value 8-bit data as lower bits to the upper 16-bit data, thereby allowing the 16-bit audio data to be output in the original full 24-bit form.

Figure 27:
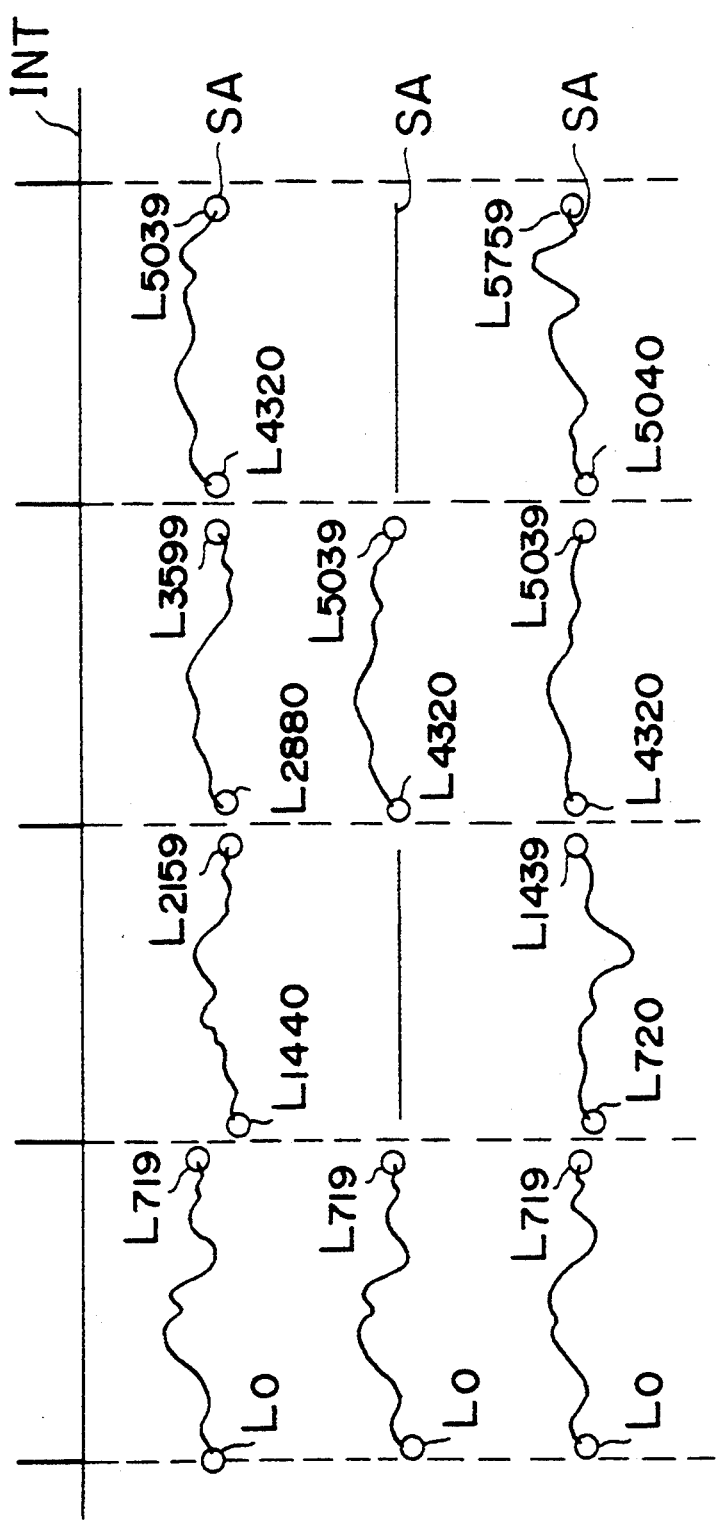
FIGS. 27A to 27D are signal waveform diagrams explaining processing for prevent intermittent sound.

As shown in FIGS. 27A to 27D, the magnetic recording and/or reproducing apparatus 50 achieves reproduction of continuous audio signal SA (FIG. 27B) in synchronization with the interleave period of the digital audio tape recorder 1 represented by the reference signal INT (FIG. 27A).

In this case, out of two pairs of recording tracks, the fourth recording track TB2 bearing the upper bit audio data is not scanned by a magnetic head, and thus no reproduction is possible. The magnetic recording and-/or reproducing apparatus 50 thus reproduces audio data by skipping from the audio data corresponding to this track to the audio data of a next interleave period. Although audio signal is reproduced at a doubled speed, discrete audio signal is practically reproduced for a period of 30 [msec] at an original reproducing speed.

By allocating the upper bit audio data for recording to the first and the fourth recording tracks, out of two pairs of recording tracks, continuous audio data are reproduced even when in double reproducing speed.

Figure 28:
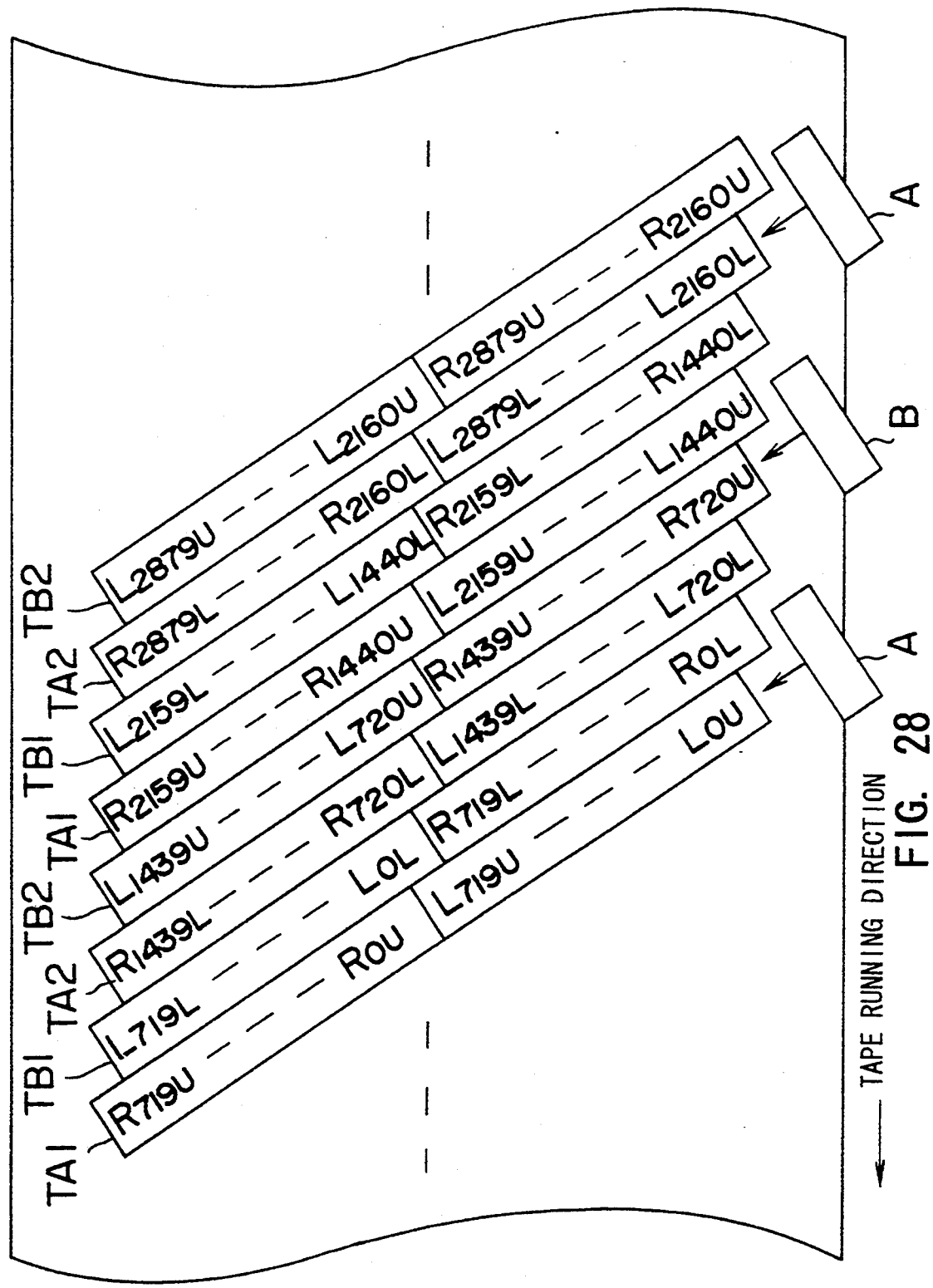
FIG. 28 is a schematic diagram showing scanning of the magnetic head in a triple reproducing speed.

When the reproducing operation is done at a triple speed, the digital audio tape recorder 1, as shown in FIG. 28, allows the first magnetic head A having a positive azimuth angle to scan the corresponding recording track TA1 first, and then allows the second magnetic head B to scan the negative azimuth angled recording track TB1 three tracks apart from the recording track TA1.

Therefore, when the reproducing speed is tripled, the digital audio tape recorder 1 reproduces selectively the upper bit audio data only, and then for a next interleave period, reproduces selectively the lower bit audio data only.

In this case, in succession to the reproduction of the upper bit audio data $L_{OU}$, ..., $L_{719U}$, $R_{OU}$, ..., $R_{719U}$, the upper bit audio data $R_{720U}$, ..., $R_{1439U}$, $L_{720U}$, ..., $L_{1439U}$ in a succeeding interleave period are reproduced in stead of the lower bit audio data $R_{OL}$, ..., $R_{719L}$, $L_{OL}$, ..., $L_{719L}$. Therefore, in the audio data DATA2 which the digital signal processing circuit 20 outputs by de-interleaving, the audio data $L_{OU}$, ..., $L_{719U}$, $R_{OU}$, ..., $R_{719U}$ reproduced from the first recording track TA1 is interspersed with the audio data $R_{720U}$, ..., $R_{1439U}$, $L_{720U}$, ..., $L_{1439U}$ reproduced from the fourth recording track TB1 before they are output.

In a further succeeding interleave period, instead of the upper audio bit data, only the lower bit audio data is reproduced and output in the sequence of reproduction.

Specifically, as shown in FIGS. 29A to 29E, the audio data DATA2 provided in synchronization with the reference signal INT and clock WCK (FIGS. 29A and 29B) are sequentially output as follows: the left-channel upper-bit data $L_{OU}$ reproduced from the first recording track, the right-channel upper-bit audio data and the left-channel upper-bit audio data, $R_{720U}$ and $L_{720U}$ reproduced from the third recording track, the right-channel upper-bit audio data and the left-channel upper-bit audio data R0U and L1U reproduced from the first recording track, ... (FIG. 29C).

In the succeeding interleave period, the lower bit audio data instead of the upper bit audio data are output in the above sequence.

While these upper-bit audio data are input relative to the frame address, the data converting circuit 54 performs the same data processing identical to that in the doubled speed operation, and thus provides digital audio signal (FIG. 29E) in which right- and left-channel audio data are arranged in a continuous manner in synchronization with the reference signal LRCK (FIG. 29D).

While the lower-bit audio data are input, however, output data are given in a mute mode. The magnetic recording and/or reproducing apparatus 50 thus outputs discretely audio signal SA in a period of 30 [msec] (FIG. 27C).

If the reproduction takes place at the tripled speed in this way, the audio signal is intermittently reproduced and thus is unconformable to listen.

In this embodiment, the magnetic recording and/or reproducing apparatus 50 has both a selecting circuit 56 and a random access memory 57 inserted between the digital signal processing circuit 20 and the data converting circuit 54 in order to prevent intermittent reproduction of audio signal.

Although the magnetic recording and/or reproducing apparatus 50 gives the output data from the digital signal processing circuit 20 directly to the data converting circuit 54 in the normal variable speed reproducing mode, this operation is switched over by manipulating a designated switch in order to reproduce a non-intermittent audio signal in the tripled speed operation.

The selecting circuit 56 switches its contact points in the interleave period according to the frame address. This allows audio data to be delivered directly to the data converting circuit 54 while the upper-bit audio data are output from the digital signal processing circuit 20.

As shown in FIGS. 30A to 30E, for this duration, the magnetic recording and/or reproducing apparatus 50 thus provides a continuous audio signal in the same manner as the standard tripled speed reproducing mode (FIGS. 30A to 30E).

For the succeeding duration in which the lower-bit audio data are output from the digital signal processing circuit 20, the selecting circuit 56 switches its contact points in order to deliver the output data saved in a read only memory circuit 57 to the data converting circuit 54.

By saving the output data from the digital signal processing circuit 20 for later delivery in a sequential manner, the read only memory circuit 57 delays the output data of the digital signal processing circuit 20 by approximately one interleave period.

For the duration in which the lower-bit audio data is output by the digital signal processing circuit 20, the data converting circuit 54 processes the approximately one-interleave period delayed audio data provided by the read only memory circuit 57. In this way, the audio data reproduced from the fourth recording track are reproduced for this duration of time.

Therefore, when the triple-speed reproducing operation is in use, the magnetic recording and/or reproducing apparatus 50 prevents intermittent sound in the audio signal SA.

Furthermore, when the reproducing speed is set to an even-numbered multiple of the standard speed, such as four-fold, six-fold, eight-fold, ..., the magnetic recording and/or reproducing apparatus 50 allows the digital signal processing circuit 20 to selectively output the upper-bit audio data in the same manner as in the double-speed reproducing. The magnetic recording and/or reproducing apparatus 50 process output data from the digital signal processing circuit 20 in such a way that data is processed in the double-speed reproducing, and thus prevents intermittent sound in the reproduced audio signal.

When the reproducing speed is set to an odd-numbered multiple of the standard speed, such as five-fold, seven-fold, nine-fold, ..., the magnetic recording and/or reproducing apparatus 50 allows the digital signal processing circuit 20 to output the upper-bit and lower-bit audio data in the same manner as in the triple-speed reproducing. The magnetic recording and/or reproducing apparatus 50 processes the output data from the digital signal processing circuit 20 in such a way that data are processed in the triple-speed reproducing, and thus prevents intermittent sound in reproducing audio signal.

According to the construction shown in FIG. 20, 24-bit audio data are divided into upper bits and lower bits, the upper bit data, the lower bit data, the lower bit data, and the upper bit data of each channel's audio data in that order are allocated to two pairs of recording tracks for recording. Thus, high-quality audio is reproduced in an easy and reliable manner, and intermittent sound in reproducing is prevented.

(5) Other Embodiments

In the third embodiment described above, the upper bits and the lower bits are discriminated by the frame address. This invention is not only limited to this, but alternatively remaining bits may be used for discrimination as in the first embodiment.

In the second and third embodiments described above, the upper bits and the lower bits are discriminated by the frame address of sub-data. This invention is not only limited to this, but alternatively, data for reserve purpose in sub-code data may be used for discrimination.

In the above embodiments, the upper bits and the lower bits, when divided, are respectively 16 bits long and 4 bits long. This invention is not only limited to this. The upper bits and the lower bits may be optionally set to a variety of bit length when they are divided.

Furthermore in the above embodiments, 20-bit audio data are recorded and reproduced. This invention is not only limited to this. This invention may be widely applied to recording and reproducing applications which use a variety of bit length as required.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A recording and reproducing apparatus for recording and/or reproducing left channel and right channel audio data with a high it rate, wherein a running speed of a magnetic tape and a number of revolutions of a rotary head round which said magnetic tape is wrapped are controlled to "N" times in case of normal mode (N≧2: "N" is a positive integer), and processing speeds of a reproducing signal processing unit, a modulating circuit, a demodulating circuit, and a recording signal processing unit are "N" times in case of the normal mode, said recording and reproducing apparatus comprising:

dividing means for dividing quantized data a number of bits of which is "m" into upper-bit data a number of bits of which is "$m_1$" and lower-bit data a number of bits of which is "$m_2$" for each left and right channel;

discriminating data generating means for generating discriminating data for discriminating between said upper "$m_1$" bits data and lower "$m_2$" bits data;

data converting means for converting each of said upper "$m_1$" bits data and lower "$m_2$" bits data into "n" bits data (n≧$m_1$, n>$m_2$), and sequentially outputting them at said N times processing period;

recording signal generating means for interleaving an output from said data converting means at said N times interleaving period, and then converting them into recording data with error correcting codes; and recording data recording means for forming N pairs of recording tracks having a positive or a negative azimuth angle at said N times interleaving period, and sequentially recording said recording data and discriminating data in a predetermined area onto said N pairs of recording tracks (N, m, $m_1$, $m_2$, and n are positive integers); wherein said data converting means further operates for setting said processing period to twice said interleaving period, and dividing each of recording tracks into a scan start side recording area and a succeeding scan end side recording area, with respect to two pairs of said recording tracks formed by said processing period;

in said two pairs of recording tracks consisting of first, second, third, and fourth recording tracks:

one of said left channel or said right channel upper-bit data of the first half of said processing period is allocated to said scan start side recording area of the first recording track, and the other of said left channel or said right channel lower-bit data of the first half of said processing period is allocated to said succeeding scan end side recording area;

said other of said left channel or said right channel upper-bit data of the first half of said processing period is allocated to said scan start side recording area of the second recording track, and said one of said left channel or said right channel lower-bit data of the first half of said processing period is allocated to the succeeding scan end side recording area;

one of said left channel or said right channel lower-bit data of the second half of said processing period is allocated the said scan start side recording area of the third recording track, and the other of said left channel or right channel upper-bit data of the second half of said processing period is allocated to the succeeding scan end side recording area; and said other of said left channel or said right channel lower-bit data of the second half of said processing period is allocated to said scan start side recording area of the fourth recording track, and said other of said left channel or right channel upper-bit data of the second half of said processing period is allocated to the succeeding scan end side recording area.

2. A recording and reproducing apparatus according to claim 1, wherein;

said data converting means adds discriminating data from the discriminating data generating means with a redundant bit when each of upper "$m_1$" bits data and lower "m" bits data is converted into "n" bits data (here, $n > m_1$, $n > m_2$).

3. A recording and reproducing apparatus according claim 2, further comprising:

means for reproducing said reproducing signal from said magnetic tape;

means for demodulating said reproducing signal;

signal processing means for error-correcting said demodulated reproducing signal, which is de-interleaved thereafter and is output; and wherein said data converting means links said upper bits and lower bits which have been separated and recorded, based on said discriminating data included in said output data.

4. A recording and reproducing apparatus according to claim 3, wherein;

said data converting means selects upper-bit data from said demodulated reproducing signal based on said discriminating data, in a variable speed reproducing mode, and outputs the selected upper-bit data.

5. A recording and reproducing apparatus according to claim 4, wherein:

said data converting means selectively inputs upper-bit data output from said reproducing apparatus in the variable speed reproducing mode, expands the received data along the time axis, and outputs the time-expanded data in the sequence as they are recorded.

6. A recording and reproducing apparatus according to claim 5, said data converting means further comprising:

a delay circuit for delaying said reproducing signal output from said reproducing means by a predetermined interleaving period and producing delayed output data; and selective processing means for processing selectively output data from said delay circuit or said reproducing signal output from said reproducing means wherein:

in the variable speed reproducing mode, a processing object of said selective processing means is switched at said interleaving period corresponding to a reproducing speed, so that said upper-bit data provided in a sequence different from that taken for recording, are output in the sequence as they are recorded.

7. A recording and reproducing apparatus according to claim 1, wherein:

said discriminating data generating means comprises means for generating sub-code data including a sampling frequency information and a time information, and allocates the discriminating data to said sub-code data output thereafter from said discriminating data generating means;

said recording signal generating means interleave processes said sub-code data which is error-correct processed thereafter, and then converts said sub-code data into recording data; and said recording data recording means sequentially records said recording data onto a predetermined area of said N pairs of recording tracks.

8. A recording and reproducing apparatus according to claim 1, wherein:

$N=2$, $m=20$, $m_1=16$, $m_2=4$, and $n=16$.

9. A recording and reproducing apparatus for recording and/or reproducing left channel and right channel audio data with a high bit rate, wherein a running speed of a magnetic tape and a number of revolutions of a rotary head round which said magnetic tape is wrapped are controlled to "N" times in case of normal mode ($N \geq 2$: "N" is a positive integer), processing speeds of a reproducing signal processing unit, a modulating circuit, a demodulating circuit, and a recording signal processing unit are "N" times in case of the normal mode, said recording and reproducing apparatus comprising:

dividing means for dividing quantized data a number of bits of which is "m" into upper-bit data a number of bits of which is "m" and lower-bit data a number of bits of which is "m" for each left and right channel;

discriminating data generating means for generating discriminating data for discriminating between said upper "$m_1$" bits data and lower "$m_2$" bits data;

data converting means for converting each of said Upper "$m_1$" bits data and lower "$m_2$" bits data into "n" bits data ($n \geq m_1$, $n > m_2$), and sequentially outputting them at said N times processing period;

recording signal generating means for interleaving an output from said data converting means at said N times interleaving period, and then converting them into recording data with error correcting codes; and recording data recording means for forming N pairs of recording tracks having a positive or a negative azimuth angle at said N times interleaving period, and sequentially recording said recording data and discriminating data in a predetermined area onto said N pairs of recording tracks m, $m_1$, $m_2$, and n are positive integers); wherein:

said data converting means further operates for setting said processing period to twice said interleaving period, and dividing each of said recording tracks into a scan start side recording area and a succeeding scan end side recording area;

in two pairs of said N pairs of recording tracks consisting of first, second, third, and fourth recording tracks formed in said processing period:

one of said left channel or said right channel upper-bit data of the first half of said processing period is allocated to said scan start side recording area of the first recording track, and the other of said left channel or said right channel lower-bit data of the first half of said processing period is allocated to the succeeding scan end side recording area;

said one of said left channel or said right channel lower-bit data of the first half of said processing period is allocated to said scan start side recording area of the second recording track, and said other of said left channel or right channel upper-bit data of the first half of said processing period is allocated to the succeeding scan end side recording area;

said other of said left channel or said right channel upper-bit data of the second half of said processing period is allocated to said scan start side recording area of the third recording track, and said one of said left channel or right channel lower-bit data of the second half of said processing period is allocated to the succeeding scan end side recording area;

said other of said left channel or said right channel lower-bit data of the second half of said processing period is allocated to said scan start recording area of the fourth recording track, and said one of said left channel or said right channel upper-bit data of the second half of said processing period is allocated to the succeeding scan end side recording area; and converting data in which said upper-bit data and lower-bit data are continuous are generated.

10. A recording and reproducing apparatus according to claim 9, further comprising:

means for reproducing said reproducing signal from said magnetic tape;

means for demodulating said reproducing signal;

signal processing means for error-correcting said demodulated reproducing data which is de-interleaved thereafter, and separating thus de-interleaved reproducing signal into sampling frequency information and reproducing data; and wherein said data converting means extracts discriminating data based on said sampling frequency information, and links said upper bits and said lower bits which are output thereafter.

11. A recording and reproducing apparatus according to claim 10, wherein:

said data converting means selects upper-bit data from said demodulated reproducing signal based on said discriminating data, in a variable speed reproducing mode, and outputs the selected upper-bit data.

12. A recording and reproducing apparatus according to claim 11, wherein:

said data converting means selectively receives the upper-bit data output from said reproducing circuits, expands the received data along the time axis, and then outputs the time-expanded data in the sequence as they are recorded.

13. A recording and reproducing apparatus according to claim 12, said data converting means further comprising:

a delay circuit for delaying said reproducing signal output from said reproducing means by a predetermined interleaving period and producing delayed output data; and selective processing means for processing selectively output data from said delay circuit or said reproducing signal output from said reproducing means, wherein:

in the variable speed reproducing mode, a processing object of said selective processing means is switched at said interleaving period corresponding to reproducing speed, so that said upper-bit data provided in a sequence different from that taken for recording, are output in the sequence as they are recorded.

14. A recording and reproducing apparatus according to claim 9, wherein:

$N=2$, $m=24$, $m_1=16$, $m_2=8$, and $n=16$.

15. A recording and reproducing apparatus for recording and/or reproducing left channel and right channel audio data with a high bit rate, wherein a running speed of a magnetic tape and a number of revolutions of a rotary head round which said magnetic tape is wrapped are controlled to "N" times in case of normal mode ($N \geq 2$: "N" is a positive integer), and processing speeds of a reproducing signal processing unit, a modulating circuit, a demodulating circuit, and a recording signal processing unit are "N" times in case of the normal mode, said recording and reproducing apparatus comprising:

dividing means for dividing quantized data a number of bits of which is "m" into upper-bit data a number of bits of which is "$m_1$" and lower-bit data a number of bits of which is "$m_2$" for each left and right channel;

discriminating data generating means for generating discriminating data for discriminating between said upper "$m_1$" bits data na lower "$m_2$" bits data;

data converting means for converting each of said upper "$m_1$" bits data and lower "$m_2$" bits data into "n" bits data ($n \geq m_1$, $n > m_2$), and sequentially outputting them at said N times processing period;

recording signal generating means for interleaving an output from said data converting means at said N times interleaving period, and then converting them into recording data with error correcting codes; and recording data recording means for forming N pairs of recording tracks having a positive or a negative azimuth angle at said N times interleaving period, and sequentially recording said recording data and discriminating data in a predetermined area onto said N pairs of recording tracks (N, m, $m_1$, $m_2$, and n are positive integers); wherein:

said data converting means further operates for setting said processing period to twice said interleaving period, and dividing each of said recording tracks into a scan start side recording area and a scan end side recording area;

in two pairs of said N pairs of recording tracks consisting of first, second, third and fourth recording tracks formed in said processing period:

one of said left channel or said right channel upper-bit data of the first half of said processing period is allocated to said scan start side recording area of the first recording track, and the other of said left channel or said right channel upper-bit data of the first half of said processing period is allocated to the succeeding scan end side recording area;

said other of said left channel or said right channel lower-bit data of the first half of said processing period is allocated to said scan start side recording area of the second recording track, and said one of said left channel or said right channel lower-bit data of the first half of said processing period is allocated to the succeeding scan end side recording area;

said one of said left channel or said right channel lower-bit data of the second half of said processing period is allocated to said scan start side recording area of the third recording track, and said other of said left channel or said right channel lower-bit data of the second half of said processing period is allocated to the succeeding scan end side recording area;

said other of said left channel or said right channel upper-bit data of the second half of said processing period is allocated to said scan start side recording area of the fourth recording track, and said one of said left channel or said right channel upper-bit data of the second half of said processing period is allocated to the succeeding scan end side recording area; and converting data in which said upper-bit data and said lower-bit data are continuous are generated.

16. A recording and reproducing apparatus according to claim 15, wherein:

$N=2, m=24, m_1=16, m_2=8,$ and $n=16$.

17. A recording and reproducing apparatus according to claim 15, wherein:

$N=2, m=20, m_1=15, m_2=5,$ and $n=16$.

* * * * *